(12) United States Patent
Matsuoka et al.

(10) Patent No.: US 12,346,851 B2
(45) Date of Patent: *Jul. 1, 2025

(54) AUTOMATED RECOMMENDATION AND CURATION OF TASKS FOR EXPERIENCES

(71) Applicant: Yohana LLC, Palo Alto, CA (US)

(72) Inventors: Yoky Matsuoka, Los Altos Hills, CA (US); Nitin Viswanathan, San Francisco, CA (US); Gwendolyn W. van der Linden, Redwood City, CA (US); Amy Y. Seng, El Cerrito, CA (US); Lingyun Liu, Sunnyvale, CA (US); Benjamin Deming, Campbell, CA (US); Sean Paterson, Mountain View, CA (US)

(73) Assignee: Panasonic Well LLC, Palo Alto, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/741,549

(22) Filed: May 11, 2022

(65) Prior Publication Data

US 2022/0366352 A1 Nov. 17, 2022

Related U.S. Application Data

(60) Provisional application No. 63/188,396, filed on May 13, 2021.

(51) Int. Cl.
*G06Q 10/0631* (2023.01)
*G06Q 10/0639* (2023.01)

(52) U.S. Cl.
CPC .. *G06Q 10/063112* (2013.01); *G06Q 10/0639* (2013.01)

(58) Field of Classification Search
None
See application file for complete search history.

(56) References Cited

U.S. PATENT DOCUMENTS 10,791,212 B1 * 9/2020 Mattox, Jr. ....... H04M 1/72451
10,902,534 B2 1/2021 Ray et al.
(Continued)

OTHER PUBLICATIONS

M. H. Goker, P. Langley, C. A. Thompson, "A Personalized System for Conversational Recommendations", 2011, https://doi.org/10.48550/arXiv.1107.0029 (Year: 2011).*

(Continued)

*Primary Examiner* — Mehmet Yesildag
(74) *Attorney, Agent, or Firm* — Polsinelli LLP

(57) ABSTRACT

Systems and methods for generating and providing experience recommendations to members of a task facilitation service are provided. A task recommendation system can identify a set of experience recommendations within a geographic region. These experience recommendations are ordered based on a member profile. The ordered experience recommendations are provided such that one or more experience recommendations can be selected for presentation to the member. When the member selects an experience recommendation, tasks corresponding to the experience recommendation are generated and performance of these tasks is monitored. The member profile is updated based on the performance of these tasks, the selected experience recommendation, and feedback corresponding to performance of these tasks.

21 Claims, 9 Drawing Sheets

(56) References Cited

U.S. PATENT DOCUMENTS

| | | |
|---|---|---|
| 2014/0164274 A1* | 6/2014 | Mai .................. G09B 5/00 |
| | | 705/327 |
| 2015/0073841 A1 | 3/2015 | Gray et al. |
| 2016/0148256 A1 | 5/2016 | Chavarria et al. |
| 2016/0148257 A1 | 5/2016 | Chavarria et al. |
| 2017/0017649 A1* | 1/2017 | Srinivasaraghavan .. G06N 3/08 |
| 2017/0061392 A1 | 3/2017 | Guinea et al. |
| 2017/0091664 A1 | 3/2017 | Sanchez et al. |
| 2019/0163985 A1 | 5/2019 | Wang et al. |
| 2019/0214024 A1* | 7/2019 | Gruber ............. G06F 16/2457 |
| 2019/0378397 A1 | 12/2019 | Williams, II et al. |
| 2021/0109938 A1 | 4/2021 | LaPoff et al. |
| 2021/0192420 A1 | 6/2021 | Spielman et al. |
| 2022/0107984 A1 | 4/2022 | Reed |

OTHER PUBLICATIONS

International Search Report and Written Opinion mailed Aug. 19, 2022 in International Application PCT/US2022/028679.
International Preliminary Report on Patentability mailed Nov. 23, 2023 in International Application PCT/US2022/028679.
International Search Report and Written Opinion mailed Nov. 21, 2024 in International Application PCT/US2024/042784.
Office Action mailed Oct. 10, 2024 in U.S. Appl. No. 18/807,694.
Notice of Allowance mailed Feb. 25, 2025 in U.S. Appl. No. 18/807,694.

* cited by examiner

AUTOMATED RECOMMENDATION AND CURATION OF TASKS FOR EXPERIENCES

CROSS-REFERENCE TO RELATED APPLICATIONS

The present patent application claims the priority benefit of U.S. provisional patent application No. 63/188,396 filed May 13, 2021, the disclosures of which are incorporated by reference herein.

FIELD

The present disclosure relates to the determination and delegation of tasks for personalized member experiences. In one example, the systems and methods described herein may be used to identify and recommend experiences that may be curated for the benefit of a member. Further, the systems and methods described herein may be used to provide automated coordination for the performance of tasks associated with a selected experience.

SUMMARY

Disclosed embodiments may provide a framework to identify and recommend experiences to a member of a task facilitation service in order to reduce the member's cognitive load and allow the member to partake in enjoyable activities. According to some embodiments, a computer-implemented method is provided. The computer-implemented method comprises receiving a request to identify an experience recommendation corresponding to an experience available for curation on behalf of a member. The computer-implemented method further comprises identifying a set of experience preferences associated with the member. The set of experience preferences are identified based on a profile associated with the member. The computer-implemented method further comprises automatically querying in real-time a resource library to identify a set of available experiences. The computer-implemented method further comprises simultaneously processing the set of available experiences, the set of experience preferences, previously provided experience recommendations, and feedback corresponding to the previously provided experience recommendations to generate a set of experience recommendations. The set of experience recommendations correspond to one or more available experiences from the set of available experiences. The computer-implemented method further comprises providing the set of experience recommendations. When the set of experience recommendations are received, one or more experience recommendations are presented to the member. The computer-implemented method further comprises detecting selection of an experience recommendation from the one or more experience recommendations. The selection is an indication of a request to curate an experience corresponding to the experience recommendation. The computer-implemented further comprises automatically generating one or more tasks corresponding to the experience recommendation. The computer-implemented further comprises monitoring in real-time performance of the one or more tasks. The computer-implemented method further comprises updating the profile in real-time based on the performance of the one or more tasks, the selection, and feedback corresponding to the performance of the one or more tasks.

In some embodiments, the set of experience recommendations is generated based on experience recommendation scores corresponding to the one or more available experiences. Further, an experience recommendation score corresponds to a likelihood of a corresponding experience recommendation being selected.

In some embodiments, the request is generated in response to detecting that a cognitive load score for the member is above a maximum threshold value.

In some embodiments, the computer-implemented method further comprises generating templates for the set of experience recommendations. A template indicates what information is required from the member for performance of tasks associated with a corresponding experience recommendation. The computer-implemented method further comprises providing a template corresponding to the experience recommendation selected by the member. When the template is received, the template is automatically populated based on the profile.

In some embodiments, the computer-implemented method further comprises receiving a request to generate a proposal for the experience recommendation. The computer-implemented method further comprises providing a proposal template corresponding to the experience recommendation. The proposal template is provided with a set of data fields provided according to the profile. The computer-implemented method further comprises presenting a completed proposal. The completed proposal is presented as a result of receiving the proposal template. The computer-implemented method further comprises monitoring in real-time member interaction with the completed proposal. The member interaction is used to identify revisions to the proposal template.

In some embodiments, the computer-implemented method further comprises receiving a set of messages exchanged between the member and a representative as the set of messages are exchanged. The computer-implemented method further comprises using a Natural Language Processing (NLP) algorithm to automatically identify in real-time the request.

In some embodiments, the computer-implemented method further comprises detecting rejection of another experience recommendation from the one or more experience recommendations. The computer-implemented method further comprises automatically updating the profile based on the rejection to reduce a likelihood of similar experience recommendations to the other experience recommendation being presented to the member.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to identify and recommend experiences to a member of a task facilitation service in order to reduce the member's cognitive load and allow the member to partake in enjoyable activities. Through this framework, the task facilitation service can generate a set of experiences in each market that the task facilitation service operates in to allow for personalization of experiences for members within the market. Further, experiences can be recommended to a member such that, if the member selects an experience, a representative assigned to the member can curate the experience on behalf of the member, thereby reducing the member's cognitive load.

Figure 1:
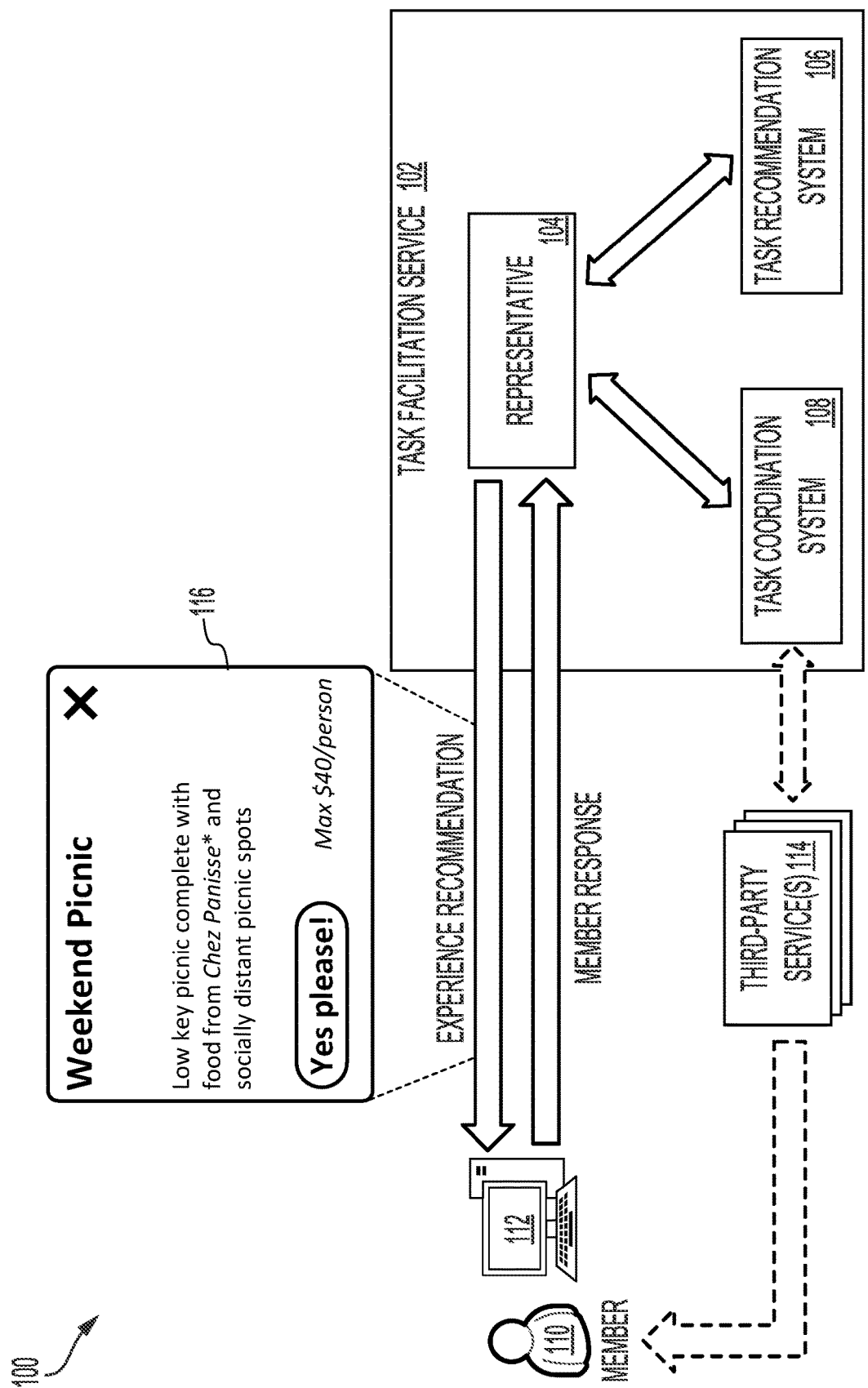
FIG. 1 shows an illustrative example of an environment in which experience recommendations are generated and provided by a task facilitation service in accordance with at least one embodiment.

FIG. 1 shows an illustrative example of an environment 100 in which experience recommendations 116 are generated and provided by a task facilitation service 102 in accordance with at least one embodiment. In the environment 100, a representative 104 associated with a task facilitation service 102 may provide a member 110 of the task facilitation service 104 with an experience recommendation 116 corresponding to a personalized experience that may be enjoyable to the member 110 and to their family. The task facilitation service 102 may be implemented to reduce the cognitive load on members and their families in performing various tasks in and around their homes by identifying and delegating tasks to representatives that may coordinate performance of these tasks for the benefit of these members.

A member, such as member 110, may be paired with a representative 104 during an onboarding process, through which the task facilitation service 102 may collect identifying information of the member 110. For instance, the task facilitation service 102 may provide, to the member 110, a survey or questionnaire through which the member 110 may provide identifying information usable to select a representative 104 for the member 110. The task facilitation service 102 may prompt the member 110 to provide detailed information with regard to the composition of the member's family (e.g., number of inhabitants in the member's home, the number of children in the member's home, the number and types of pets in the member's home, etc.), the physical location of the member's home, any special needs or requirements of the member 110 (e.g., physical or emotional disabilities, etc.), and the like. In some instances, the member 110 may be prompted to provide demographic information (e.g., age, ethnicity, race, languages written/spoken, etc.). The member 110 may also be prompted to indicate any personal interests or hobbies that may be used to identify possible experiences that may be of interest to the member 110 (described in greater detail herein).

In an embodiment, the data associated with the member 110 is used by the task facilitation service 102 to create a member profile corresponding to the member 110. As noted above, the task facilitation service 102 may provide, to the member 110, a survey or questionnaire through which the member 110 may provide identifying information associated with the member 110. The responses provided by the member 110 to this survey or questionnaire may be used by the task facilitation service 102 to generate an initial member profile corresponding to the member 110. In an embodiment, once a representative has been assigned to the member 110, the task facilitation service 102 can prompt the member 110 to generate a new member profile corresponding to the member 110. For instance, the task facilitation service 102 may provide the member 110 with a survey or questionnaire that includes a set of questions that may be used to supplement the information previously provided during the aforementioned onboarding process. For example, through the survey or questionnaire, the task facilitation service 102 may prompt the member 110 to provide additional information about family members, important dates (e.g., birthdays, etc.), dietary restrictions, and the like. Based on the responses provided by the member 110, the task facilitation service 102 may update the member profile corresponding to the member 110.

In some instances, the member profile may be accessible to the member 110, such as through an application or web portal provided by the task facilitation service 102. Through the application or web portal, the member 110 may add, remove, or edit any information within the member profile. The member profile, in some instances, may be divided into various sections corresponding to the member, the member's family, the member's home, and the like. Each of these sections may be supplemented based on the data associated with the member 110 collected during the onboarding process and on any responses to the survey or questionnaire provided to the member 110 after assignment of a representative to the member 110. Additionally, each section may include additional questions or prompts that the member 110 may use to provide additional information that may be used to expand the member profile. For example, through the member profile, the member 110 may be prompted to provide any credentials that may be used to access any external accounts (e.g., credit card accounts, retailer accounts, etc.) in order to facilitate completion of tasks.

The collected identifying information may be used by the task facilitation service 102 to identify and assign a representative 104 to the member 110. For instance, the task facilitation service 102 may use the identifying information of a member 110, as well as any information related to the member's level of comfort or interest in delegating tasks to others, and any other information obtained during the onboarding process as input to a classification or clustering algorithm configured to identify representatives that may be well-suited to interact and communicate with the member 110 in a productive manner. Using the classification or clustering algorithm, the task facilitation service 102 may identify a representative 104 that may be more likely to develop a positive, long-term relationship with the member 110 while addressing any tasks that may need to be addressed for the benefit of the member 110. In some instances, the task facilitation service 102 may select a representative 104 based on information corresponding to the availability of the set of representatives associated with the task facilitation service 102. For instance, the task facilitation service 102 may automatically select the first available representative from a set of representatives. In some instances, the task facilitation service 102 may automatically select the first available representative that satisfies one or more criteria corresponding to the member's identifying information. For example, the task facilitation service 102 may automatically select an available representative that is within geographic proximity of the member 110, shares a similar background as that of the member 110, and the like.

The representative 104 may be an individual that is assigned to the member 110 according to degrees or vectors of similarity between the member's and representative's demographic information. For instance, if the member 110 and the representative 104 share a similar background (e.g., attended university in the same city, are from the same hometown, share particular interests, etc.), the task facilitation service 102 may be more likely to assign the representative 104 to the member 110. Similarly, if the member 110 and the representative 104 are within geographic proximity to one another, the task facilitation service 102 may be more likely to assign the representative 104 to the member 110.

In an embodiment, the representative 104 can be an automated process, such as a bot, that may be configured to automatically engage and interact with the member 110. For instance, the task facilitation service 102 may utilize the responses provided by the member 110 during the onboarding process as input to a machine learning algorithm or artificial intelligence to generate a member profile and a bot that may serve as a representative 104 for the member 110. The bot may be configured to autonomously chat with the member 110 to generate tasks and proposals, perform tasks on behalf of the member 110 in accordance with any approved proposals, and the like as described herein. The bot may be configured according to the parameters or characteristics of the member 110 as defined in the member profile.

As the bot communicates with the member 110 over time, the bot may be updated to improve the bot's interaction with the member 110.

When a representative 104 is assigned to the member 110 by the task facilitation service 102, the task facilitation service 102 may notify the member 110 and the representative 104 of the pairing. Further, the task facilitation service 102 may establish a chat session or other communications session between the member 110 and the assigned representative 104 to facilitate communications between the member 110 and the representative 104. For instance, via a web portal or an application provided by the task facilitation service 102 and installed on the computing device 112, the member 110 may exchange messages with the assigned representative 104 over the chat session or other communication session. Similarly, the representative 104 may be provided with an interface through which the representative may exchange messages with the member 110.

In an embodiment, the representative 104 can suggest one or more tasks based on member characteristics, task history, and other factors. For instance, as the member 110 communicates with the representative 104 over the chat session, the representative 104 may evaluate any messages from the member 110 to identify any tasks that may be performed to reduce the member's cognitive load. As an illustrative example, if the member 110 indicates, over the chat session, that their spouse's birthday is coming up, the representative 104 may utilize their knowledge of the member 110 to develop one or more tasks that may be recommended to the member 110 in anticipation of their spouse's birthday. The representative 104 may recommend tasks such as purchasing a cake, ordering flowers, setting up a unique travel experience for the member 110 and their spouse, and the like. In some embodiments, the representative 104 can generate task suggestions without member input. For instance, as part of the onboarding process, the member 110 may provide the task facilitation service 102 with access to one or more member resources, such as the member's calendar, the member's personal fitness devices (e.g., fitness trackers, exercise equipment having communication capabilities, etc.), the member's vehicle data, and the like. Data collected from these member resources may be monitored by the representative 104, which may parse the data to generate task suggestions for the member 110.

In an embodiment, in addition to recommending tasks that may be performed for the benefit of the member 110, a representative 104 can recommend one or more curated experiences that may be appealing to the member 110 to take their mind off of urgent matters and to spend more time on themselves and their families. As noted above, during an onboarding process, a member 110 may be prompted to indicate any of their interests or hobbies that the member 110 finds enjoyable. Further, as the representative 104 continues its interactions with the member 110 over the chat session, the representative may prompt the member 110 to provide additional information regarding its interests in a natural way. For instance, a representative may ask the member 110 "what will you be doing this weekend?" Based on the member response, the representative 104 may update the member profile to indicate the member's preferences. Thus, over time, the representative and the task facilitation service 102 may develop a deeper understanding of the member's interests and hobbies. In some instances, the representative 104 may add or otherwise modify information within the member profile based on information shared with the representative and/or on the representative's own observations regarding the member 110.

The task facilitation service 102 may include a task recommendation system 106, which may be configured to generate task and experience recommendations that may be provided to members of the task facilitation service 102. The task recommendation system 106 may be implemented using a computer system or as an application or other executable code implemented on a computer system of the task facilitation service 102. In some examples, the task recommendation system 106 can generate a list of possible tasks that may be presented to the member 110 and that may be performed to reduce the member's cognitive load. This list of possible tasks may be generated based on an evaluation of data collected from different member sources (e.g., personal fitness or biometric devices, video and audio recordings, etc.). Additionally, the task recommendation system 106 can identify additional and/or alternative tasks based on external factors (e.g., the member's geographic location, tasks performed for the benefit of other members within the member's geographic region and/or that are otherwise similarly situated, etc.).

In addition to identifying and recommending tasks that may be performed for the benefit of the member 110, the task recommendation system 106 can generate, in each geographic market in which the task facilitation service 102 operates, a set of experiences that may be available to members of the task facilitation service 102. In an embodiment, the task recommendation system 106 can automatically query various third-party recommendation sources within each geographic market to identify any unique and/or time-limited experience opportunities that may be of interest to members of the task facilitation service 102. For instance, the task facilitation service 102 may partner with various organizations within each geographic market that provide or otherwise aggregate different experiences within each geographic market. As an illustrative example, the task facilitation service 102 may partner with a publisher of a luxury and lifestyle travel magazine to obtain any recent news or information related to upcoming experiences that may be available within each geographic market in which the task facilitation service 102 operates. As another illustrative example, the task facilitation service 102 may partner with different online marketplaces for events, lodging, and the like to identify any unique experiences that may be available within each geographic market in which the task facilitation service 102 operates.

The task recommendation system 106 may automatically query these third-party recommendation sources periodically or in response to a triggering event. For instance, the task recommendation system 106 may automatically query each of these third-party recommendation sources at regular time intervals (e.g., weekly, bi-weekly, monthly, etc.) to identify any available experiences within each geographic market in which the task facilitation service 102 operates. The available experiences from these third-party recommendation sources may include time-sensitive experiences (e.g., concerts, events, experiences available for a particular date or set of dates, etc.), experiences subject to limited availability (e.g., limited seating, limited number of deals available, etc.), and the like. Further, available experiences from these third-party recommendation services may include non-pecuniary experiences (e.g., hikes, walks, public events with no admission fees, etc.).

In an embodiment, the task recommendation system 106 stores any identified experiences from these third-party recommendation sources within a resource library maintained by the task facilitation service 102. The resource library may serve as a repository for various resources that may be used to generate new projects and/or tasks that may be performed for the benefit of members of the task facilitation service 102. For instance, the resource library may store information related to one or more third-party services and/or resources (e.g., retailers, restaurants, websites, brands, types of goods, particular goods, etc.) that may be used to define possible projects and/or tasks. Additionally, the resource library may store information corresponding to different experiences that may be available within certain geographic markets, such as in the geographic markets in which the task facilitation service 102 operates and/or in which a concentration of members may be located. In some instances, the resource library may store information corresponding to different experiences that may be available within any geographic market, as this may allow for the curation of experiences in different locations that may be of interest to members of the task facilitation service 102. The information corresponding to a particular experience may include a notation regarding the source of the experience (e.g., third-party service, travel or event guides, word-of-mouth, advertisements, etc.), a description of the experience (e.g., a concert, a wine tasting, a sporting event, etc.), a timeframe during which the experience is available (e.g., a specific date and time, a range of dates and times, etc.), locations associated with the experience (e.g., geographic location, venue name, etc.), pricing information (e.g., a set price, a range of prices, etc.), and the like.

In some instances, the task recommendation system 106 can automatically update the resource library according to the availability of experiences referenced therein. For example, if the timeframe during which a particular experience is available has expired, the task recommendation system 106 may automatically remove the experience from the resource library, as this experience may no longer be available to members. Similarly, if a particular experience is no longer available as a result of the venue associated with the experience being sold out, the task recommendation system 106 may automatically update the resource library to remove this experience from those available to members. This may prevent a representative 104 from selecting an experience from the resource library that is no longer available to the member 110.

In an embodiment, representatives and third-party entities may also update the resource library based on their knowledge of upcoming or otherwise available experiences. For example, if a representative identifies a particular experience that may be available within a geographic market (such as in response to an indication that the representative should recommend an experience to a member or through personal knowledge), the representative may create, within the resource library, an entry corresponding to the particular experience. The representative may provide, within the entry, any pertinent information regarding the experience (e.g., a description of the experience, a timeframe during which the experience is available, locations associated with the experience, pricing information, etc.). In order to ensure that the provided experience is a valid one, the task recommendation system 106 may independently verify (such as through one or more third-party recommendation sources, other representatives within the geographic market associated with the experience, etc.) that the experience is available to members of the task facilitation service 102 and that the experience is one that may be appealing to these members. For example, if a representative or third-party entity create an entry in the resource library that corresponds to an experience related to a political rally, the task recommendation system 106 may automatically remove this entry, as political rallies may be anathema or divisive amongst members of the task facilitation service 102.

In some instances, the task recommendation system 106 can automatically query each available third-party recommendation sources in response to detecting that the cognitive load for members within a geographic market exceeds a threshold value. For example, in an embodiment, the task recommendation system 106 can process member profiles corresponding to members of the task facilitation service 102 within a particular geographic market using a machine learning algorithm or artificial intelligence. The machine learning algorithm or artificial intelligence may be trained using supervised training techniques. For instance, a dataset of member profiles, corresponding projects and tasks, member-representative conversations, known cognitive loads, and resulting cognitive load scores can be selected for training of the machine learning model. The machine learning model may be evaluated to determine, based on the sample inputs supplied to the machine learning model, whether the machine learning model is producing accurate cognitive load scores for each sample member. Based on this evaluation, the machine learning model may be modified to increase the likelihood of the machine learning model generating the desired results. The machine learning model may further be dynamically trained by soliciting feedback from members and representatives with regard to the evaluations and cognitive load scores provided by the machine learning algorithm or artificial intelligence for each member. For instance, if the task recommendation system 106 determines, based on a cognitive load score for a particular member (e.g., the cognitive load score is above a threshold value, etc.), that the member's cognitive load is too high, the task recommendation system 106 may determine that the member should be provided with one or more experience recommendations in order to encourage the member to partake in an experience and reduce their cognitive load. Further, the task recommendation system 106 may obtain new feedback from the member corresponding to their cognitive load after partaking in a recommended experience. The machine learning algorithm or artificial intelligence may use this feedback to determine a new cognitive load score for the member and determine whether this new cognitive load score represents an improvement over the previous score that led to the presentation of one or more experience recommendations. This determination may be used to further train the machine learning algorithm or artificial intelligence to provide more accurate cognitive load scores that may be used to determine whether to query third-party recommendation sources to identify available experiences that may be recommended to members of the task facilitation service 102.

In an embodiment, the task recommendation system 106 can use the cognitive load scores for members within a particular geographic market to determine whether to query the resource library and the one or more third-party recommendation sources to identify available experiences that may be recommended to these members. For instance, the task recommendation system 106 may determine, based on these cognitive load scores, an average cognitive load score for the particular geographic market. If this average cognitive load score exceeds a maximum cognitive load threshold value for the geographic market, the task recommendation system 106 may determine that the average cognitive load is indicative of members within the geographic market experiencing high cognitive loads (e.g., high levels of stress, are too focused on non-enjoyable tasks, etc.). This may cause the task recommendation system 106 to automatically query the resource library and the third-party recommendation sources to identify any available experiences that may be offered to members in order to reduce their cognitive load. Further, as described in greater detail herein, the task recommendation system 106 may transmit a notification to the representatives within the geographic market to provide any information related to known available experiences within the geographic market to the task recommendation system 106 for generation of experience recommendations that may be offered to members of the task facilitation service 102.

In an embodiment, and as noted above, the task recommendation system 106 can obtain possible experience recommendations from representatives within each geographic market. For instance, representatives within each geographic market may be aware of possible experiences that may be of interest to members of the task facilitation service based on their knowledge of the geographic market. For instance, if a representative is aware of an upcoming baseball game within the New York City metropolitan area, the representative may generate a possible experience recommendation related to the upcoming baseball game. The representative may provide, to the task recommendation system 106, the date of the upcoming baseball game, the price or range of prices for tickets to the upcoming baseball game, any promotional information related to the upcoming baseball game, and the like. This information, provided by the representative, may be used by the task recommendation system 106 to generate a possible experience recommendation that may be offered to members of the task facilitation service 102 within the particular geographic market.

Returning to the example of an upcoming baseball game within the New York City metropolitan area, the representative may create an entry in the resource library corresponding to the possible experience recommendation related to the upcoming baseball game. This entry may indicate a name for the experience recommendation, a description of the experience (e.g., a baseball game, etc.), a timeframe during which the experience is available (e.g., a specific date and time, a range of dates and times, etc.), locations associated with the experience (e.g., geographic location of the ballpark, name of the ballpark, etc.), pricing information (e.g., a range of prices for different tickets available, etc.), and the like. Additionally, the entry may indicate any third-party services or resources that may be utilized to curate the experience. For example, for an experience related to an upcoming baseball game, the entry may be updated to incorporate information related to a third-party ticket broker through which tickets to the baseball game may be procured. This may allow a representative reviewing this particular experience from the resource library to identify any third-party services 114 or other resources that may be required to secure the experience for a member.

In some instances, the task recommendation system 106 may automatically create an entry in the resource library corresponding to a possible experience recommendation provided by a representative. Returning to the example of an upcoming baseball game within the New York City metropolitan area, a representative may provide, to the task recommendation system 106, the date of the upcoming baseball game, the price or range of prices for tickets to the upcoming baseball game, any promotional information related to the upcoming baseball game, and the like. In response, the task recommendation system 106 may automatically access the resource library to create a new entry corresponding to the possible experience recommendation related to the upcoming baseball game. The entry may include the information provided by the representative for this experience. In an embodiment, the task recommendation system 106 can automatically review the new entry to determine whether any additional information is required for the experience. For example, if the representative provides the aforementioned information related to the upcoming baseball game but has not indicated what third-party services or resources may be used to secure the experience (e.g., to purchase tickets, etc.), the representative may automatically, and in real-time, prompt the representative to provide information regarding these third-party services or resources. Additionally, or alternatively, the task recommendation system 106 may independently verify (such as through one or more third-party recommendation sources, other representatives within the geographic market associated with the experience, etc.) that the experience is available to members of the task facilitation service 102. Through this vetting process, the task recommendation system 106 may obtain any missing information that may be used to supplement the entry in the resource library in order to make the experience available to other representatives.

In an embodiment, the task recommendation system 106 generates, for each identified experience recommendation, a template that indicates what information may be required from a member for planning the experience recommendation and what a proposal for the experience recommendation would look like in order to allow for representatives to easily generate and present the proposal to the member. For instance, the template may incorporate data from the various third-party recommendation sources that provide high-quality recommendations, such as travel guides, food and restaurant guides, reputable publications, and the like. Further, if the experience recommendation was provided by a representative or by the task recommendation system 106 itself, as described above, the task recommendation system 106 may incorporate data from the entry corresponding to the experience recommendation stored in the resource library into the template. A template corresponding to a particular experience recommendation may make it easier for a representative to complete definition of task(s) associated with the experience recommendation.

The task recommendation system 106, in an embodiment, generates a ranking of the available experience recommendations that may be presented to the member 110 based on the member profile associated with the member 110 and/or other member 110 attributes (e.g., expressed interest in particular experience types, etc.). For instance, the task recommendation system 106 may use the set of available experience recommendations and the member profile and/or other member 110 attributes as input to a machine learning algorithm or artificial intelligence to generate an experience recommendation score for each available experience recommendation. The machine learning algorithm or artificial intelligence may be trained using supervised training techniques. For instance, a dataset of sample experience recommendations, member profiles, and resulting experience recommendation scores can be selected for training of the machine learning model. The machine learning model may be evaluated to determine, based on the sample inputs supplied to the machine learning model, whether the machine learning model is producing accurate experience recommendation scores for each sample member. Based on this evaluation, the machine learning model may be modified to increase the likelihood of the machine learning model generating the desired results.

The machine learning algorithm or artificial intelligence may further be dynamically trained by soliciting feedback from members with regard to the experience recommendations provided to the members based on corresponding experience recommendation scores or by representatives based on these representatives' knowledge of their assigned members. For instance, the task recommendation system 106 may obtain feedback from a member 110 corresponding to the experience recommendations provided to the member 110, either by the representative 104 or automatically by the task recommendation system 106. The member 110 may specify, in its feedback, which experience recommendations were received positively and which experience recommendations were received negatively or with indifference. The machine learning algorithm or artificial intelligence may use this feedback to determine a new experience recommendation score for each of the experience recommendations provided to the member 110. This feedback and the new experience recommendation scores may be used to further train the machine learning algorithm or artificial intelligence to provide more accurate experience recommendation scores that may be used to select which experience recommendations are to be provided to a member 110.

In an embodiment, the task recommendation system 106 selects one or more experience recommendations from a set of available experience recommendations that may be presented to the member 110. This selection may be performed at regular time intervals (e.g., weekly, bi-weekly, monthly, etc.) or in response to a triggering event (e.g., the cognitive load score for the member 110 exceeds a maximum cognitive load score threshold, etc.). For instance, at the start of each time interval (e.g., each week, each bi-week, each month, etc.), the task recommendation system 106 may process the set of available experience recommendations and the member profile associated with the member 110 as input to the aforementioned machine learning algorithm or artificial intelligence to obtain an experience recommendation score for each available experience recommendation. The experience recommendation score for a particular experience recommendation may correspond to the probability of the experience recommendation being received positively by the member 110. For instance, a high experience recommendation score may correspond to a high probability that the member 110 may select the experience recommendation or otherwise receive the experience recommendation positively. Alternatively, a low experience recommendation score may correspond to a low probability that the member 110 may select the experience recommendation or otherwise show indifference or negative sentiment towards the experience recommendation. Based on experience recommendation scores for the set of available experience recommendations, the task recommendation system 106 may rank the set of available experience recommendations.

From the ranked listing of available experience recommendations, the task recommendation system 106 may select one or more experience recommendations that may be presented to the member 110. For instance, the task recommendation system 106 may select, from the ranked listing of available experience recommendations, a number of the highest ranked experience recommendations. The number of selected experience recommendations may be determined based on member preferences, as indicated in the member profile. For instance, if a member 110 has indicated that it prefers to be presented with a set number of task and experience recommendations at a given time, the task recommendation system 106 may determine how many experience recommendations may be presented to the member 110. In some embodiments, the task recommendation system 106 can control how many experience recommendations may be presented at any given time, as well as to when these experience recommendations may be presented. For instance, the task recommendation system 106 may present one or more of the selected experience recommendations upon detection of the member's cognitive load score exceeding a threshold value. As another example, the task recommendation system 106 may present one or more of the selected experience recommendations automatically in response to a member request. For instance, if the member 110 submits a message to the representative 104 over the chat session between the member 110 and representative 104 that it would like to receive an experience recommendation (e.g., "I'm interested in getting away this weekend," "I heard that there are some cool shows in town," etc.), the task recommendation system 106 may review the ranked listing of available experience recommendations and select one or more relevant experience recommendations that may be presented to the member 110.

In an embodiment, the task recommendation system 106 can use natural language processing (NLP) or other artificial intelligence to evaluate exchanged messages or other communications from the member 110 to determine whether to present one or more experience recommendations to the member 110. For instance, the task recommendation system 106 may process any incoming messages from the member 110 using NLP or other artificial intelligence to detect a request from the member 110 to receive one or more experience recommendations. As an illustrative example, if the member 110 states, via the chat session with the representative 104, that "I'm interested in getting away this weekend," the task recommendation system 106 may determine, using NLP or other artificial intelligence, that the member 110 is seeking experience recommendations for available experiences that the member 110 may partake in during the upcoming weekend. Accordingly, the task recommendation system 106 may evaluate the ranked listing of available experience recommendations for the member 110 and identify one or more experience recommendations that satisfy the member's criteria (e.g., experiences that may be partaken by the member 110 during the upcoming weekend). Alternatively, the task recommendation system 106 may prompt the representative 104 to identify and present one or more experience recommendations to the member 110 in response to the member's message. For instance, the task recommendation system 106 may transmit a notification to the representative 104 (such as through an interface provided by the task facilitation service 102 to the representative 104) that the member 110 may be requesting an experience recommendation in order to reduce their cognitive load. Accordingly, the representative 104 may access the resource library to identify any possible experience recommendations that may be provided to the member 110 based on the representative's knowledge of the member and/or the member profile associated with the member 110.

In some instances, the task recommendation system 106 may provide the ranked listing of available experience recommendations to the representative 104 to allow the representative 104 to select which experience recommendations may be presented to the member 110. The representative 104 may evaluate the ranked listing of available experience recommendations and, based on its knowledge of the member 110, select one or more available experience recommendations that may be presented to the member 110. The representative's manual selection of one or more experience recommendations, as well as member feedback related to the presentation of these one or more recommendations may be recorded and used by the task recommendation system 106 to further train the machine learning algorithm or artificial intelligence used to rank available experience recommendations for the member 110. As an illustrative example, if the representative 104 selects a particular experience recommendation that has a relatively low experience recommendation score, and the member 110 responds positively to the particular experience recommendation, the task recommendation system 106 may use this data to train the machine learning algorithm or artificial intelligence to more accurately determine a positive (e.g., higher) experience recommendation score for similar experience recommendations.

In an embodiment, experience recommendations are provided to the member 110 via an interface (e.g., graphical user interface (GUI)) provided by the task facilitation service 102. For instance, as noted above, the task facilitation service 102 may provide a web portal or an application that may be installed onto a member's computing device 112. Through the computing device 112, the member 110 may access the interface through which the member 110 may access the task facilitation service 102 and communicate with the assigned representative 104. Additionally, or alternatively, the task facilitation service 102 may maintain a web server (not shown) that hosts a web portal configured to present or otherwise make available the interface through which the member 110 may access the task facilitation service 102 and communicate with the representative 104 over a chat session.

The task recommendation system 106 may display, via the interface provided by the task facilitation service 102 and presented on the computing device 112, one or more experience recommendations 116 to the member 110. An experience recommendation 116 presented via the interface may include a set of elements that allow for the member 110 to determine the parameters of the experience recommendation 116 and to determine whether to further engage with the experience recommendation 116. For example, as illustrated in FIG. 1, an experience recommendation 116 may include a descriptive title for the experience recommendation 116 (e.g., "Weekend Picnic"), a short description of the recommended experience, and any estimated costs associated with the recommended experience. Further, the experience recommendation 116 may include GUI elements that may allow for the member 110 to proceed with the provided experience recommendation 116 or to reject the provided experience recommendation 116. If the member 110 rejects the experience recommendation 116 (such as through selection of the "X" in the experience recommendation 116), the task recommendation system 106 may record the member's rejection of the experience recommendation. The task recommendation system 106 may use this rejection to further train the machine learning algorithm or artificial intelligence used to rank available experience recommendations for the member 110 such that similar experience recommendations are less likely to be selected and presented to the member 110.

In an embodiment, if the member 110 rejects a presented experience recommendation 116, the representative 104 or the task recommendation system 106 can solicit feedback from the member 110 with regard to its decision to reject the experience recommendation 116. For example, in response to a member's rejection of a presented experience recommendation 116, the representative 104 or the task recommendation system 106 may ask the member 110 why it has opted to reject the experience recommendation 116. Additionally, or alternatively, the representative 104 or the task recommendation system 106 may prompt the member 110 to rate or provide a score for the presented experience recommendation 116 to indicate its sentiment with regard to the presented experience recommendation 116. The presented experience recommendation 116, the member profile associated with the member 110, and any feedback provided by the member 110 may be processed using the machine learning algorithm or artificial intelligence to further train the machine learning algorithm or artificial intelligence to provide experience recommendations that are more likely to be selected by the member 110 and other similarly situated members of the task facilitation service 102.

In an embodiment, if the member 110 indicates (such as through selection of the "Yes please!" GUI element) that they wish to learn more about the recommended experience or to partake in the recommended experience, the representative 104 may receive a notification indicating that the member 110 has opted to learn more about the recommended experience. In response to the notification, the representative 104, via a chat session or other communications session established between the member 110 and the representative 104 for the particular experience recommendation, may provide additional details related to the recommended experience. For instance, the representative 104 may refer to the template corresponding to the particular experience recommendation 116 to obtain any additional information that is available for the experience. As an illustrative example, for the experience recommendation 116, the representative 104 may indicate that, for the experience, the representative 104 will order a special picnic lunch from Chez Panisse, that the member 110 will have a choice of outdoor picnic location from one or more recommended locations, and that a delivery option is available for food. The member 110 may review the additional information and determine whether to proceed with the experience recommendation 116.

In some instances, if the member 110 indicates that it wishes to learn more about the recommended experience, the task recommendation system 106 can evaluate the member profile associated with the member 110 to determine how much information is to be provided to the member 110 without increasing the likelihood of cognitive overload for the member 110. For instance, if the member 110 has a propensity to delegate tasks to the representative 104 and generally delegates all aspects of a task to the representative 104, the task recommendation system 106 may provide basic information associated with the task (e.g., short task description, estimated completion time for the task, etc.). However, if the member is more detail oriented and is heavily involved in the completion of tasks, the task recommendation system 106 may provide more information associated with the experience recommendation (e.g., detailed task descriptions for tasks associated with the experience recommendation, steps to be performed to complete these tasks, any budget information for the tasks, etc.). In an embodiment, the task recommendation system 106 can utilize a machine learning algorithm or artificial intelligence to determine how much information related to an experience recommendation should be presented to the member 110. For instance, the task recommendation system 106 may use the member profile associated with the member 110 and data corresponding to the tasks associated with the selected experience recommendation as input to a machine learning algorithm or artificial intelligence. The resulting output may provide a recommendation as to what information regarding the tasks associated with the experience recommendation should be presented to the member 110. In some instances, the recommendation can be provided to the representative 104, which may evaluate the recommendation and determine what information may be presented to the member 110 for the selected experience recommendation. When information for an experience recommendation is provided to the member 110, the task recommendation system 106 may monitor member interaction with the representative 104 to identify the member's response to the presentation of the information. The response may be used to further train the machine learning algorithm or artificial intelligence to provide better recommendations with regard to information that may be presented to members of the task facilitation service 102.

In an embodiment, if the member 110 determines that the representative 104 is to proceed with the experience recommendation 116, the task recommendation system 106 may add tasks associated with the experience recommendation 116 to an active queue that may be used by the task recommendation system 112 to determine which tasks a representative 104 may work on for the benefit of the member 110. For instance, a representative 104 may be presented with a limited set of tasks that the representative 104 based on the prioritization or ranking of tasks performed by the task recommendation system 106. The selection of a limited set of tasks may limit the number of tasks that may be worked on by the representative 104 at any given time, which may reduce the risk to the representative 104 of being overburdened with working on a member's task list.

In an embodiment, the task recommendation system 106 generates a project-specific interface corresponding to the experience selected by the member 110 for curation. This project-specific interface may be presented to the member 110 through the web portal or application provided by the task facilitation service 102 as a separate interface from other interfaces provided by the task facilitation service 102 (e.g., an interface corresponding to the chat session between the member 110 and the representative 104, interfaces related to other tasks and projects, etc.). Through this project-specific interface, the task recommendation system 106 may provide a specific chat or other communications session corresponding to the experience. This specific chat or other communications session corresponding to the experience may be distinct from the chat session previously established between the member 110 and the representative 104. Through this project-specific chat or other communications session, the member 110 and the representative 104 may exchange messages related to the particular experience. For example, through this project-specific chat or other communications session, the representative may prompt the member 110 for information that may be required to determine one or more parameters of tasks that may be performed for curation of the experience. Similarly, if the member 110 has questions related to the particular experience, the member 110 may provide these questions through the project-specific chat or other communications session. The implementation of the project-specific chat or other communications sessions for corresponding experiences may reduce the number of messages exchanged through other chat or communications sessions while ensuring that communications within these project-specific chat or other communications sessions are relevant to the corresponding experiences.

In addition to providing a project-specific chat or other communications session, the project-specific interface may provide a description of the particular experience, as well as information corresponding to different tasks that may be performed in order to complete the experience for the member 110. Further, for each task associated with the experience, the task recommendation system 106 may provide an additional task-specific interface accessible through the project-specific interface. Each task-specific interface may include a detailed description of the particular task that is to be performed as part of the experience. Further, the task-specific interface may provide a task-specific chat or other communications session through which the member 110 and the representative 104 may exchange messages related to the particular task being performed as part of the experience.

In an embodiment, the task recommendation system 106 can prompt the representative 104 to obtain additional information from the member 110 regarding tasks associated with the selected experience recommendation that may be used to determine how best to perform the tasks. For instance, if the member 110 has opted to proceed with a particular experience recommendation, the task recommendation system 106 may evaluate the template associated with the experience recommendation to determine what additional information is required from the member 110. For example, if the template indicates that additional information regarding the number of attendees for a picnic is required (e.g., to determine quantity of food, to determine a number of passes required, etc.), the task recommendation system 106 may prompt the representative 104 to ask the member 110, over the project-specific chat or other communications session associated with the selected experience, for this information. It should be noted that the representative 104 can review the template and prompt the member 110 for any additional information necessary for performance of the tasks associated with the experience recommendation without involvement of the task recommendation system 106. Alternatively, the task recommendation system 106 can automatically prompt the member 110 to provide this additional information without representative 104 intervention.

In an embodiment, the task recommendation system 106 provides, to the representative 104, any relevant information from the member profile corresponding to the member 110 that may be used to generate the tasks that are to be performed for curation of the experience. For example, if the representative generates a new task entitled "Lunch from Chez Panisse," the task recommendation system 106 may determine that the new task is food related. Accordingly, the task recommendation system 106 may process the member profile to identify portions of the member profile that may be relevant to the task (e.g., any dietary restrictions associated with the member 110 and any other guests, any favorite foods, budgetary constraints for food-related tasks, etc.). The task recommendation system 106 may automatically surface these portions of the member profile to the representative 104 in order to allow the representative to use this information to generate the new task. Alternatively, the task recommendation system 106 may automatically use this information to populate one or more fields within a task template for creation of the new task.

In an embodiment, once the member 110 has provided any requisite information for the tasks related to the selected experience recommendation, or the representative 104 and/or task recommendation system 106 has obtained the requisite information from the member profile, the representative 104 can generate one or more proposals for curation of the selected experience recommendation. For instance, the representative 104 may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 110 over the one or more task-specific chat or other communications sessions corresponding to the tasks associated with the selected experience recommendation. The proposal may be accessed via the web portal or application provided by the task facilitation service 102. Based on the member responses to the various options presented in the proposal, the representative 104 may indicate that it is starting the curation process for the experience. Further, the representative 104 may provide information related to the experience that may be relevant to the member 110. For example, if the member 110 has selected an option to pick-up food from a selected restaurant for a weekend picnic, the representative 104 may provide detailed driving directions from the member's home to the restaurant to pick up the food (this would not be presented if the member 110 had selected a delivery option), detailed driving directions from the restaurant to the selected venue, parking information, a listing of the food that is to be ordered, and the total price of the food order. The member 110 may review this proposal and may determine whether to accept the proposal. If the member 110 accepts the proposal, the representative 104 may proceed to perform various tasks to curate the selected experience.

In an embodiment, to generate the proposal, the representative 104 may utilize a task coordination system 108 of the task facilitation service 102. The task coordination system 108 may be implemented using a computer system or as an application or other executable code implemented on a computer system of the task facilitation service 102. In some examples, the representative 104 may utilize the aforementioned resource library to identify one or more third-party services 114 and/or resources (e.g., retailers, restaurants, websites, brands, types of goods, particular goods, etc.) that may be used for performance of tasks associated with the selected experience for the benefit of the member 110 according to the one or more task parameters identified by the representative 104 and the task recommendation system 106, as described above. A proposal may specify a timeframe for completion of a task, identification of third-party services 114 (if any) that are to be engaged for completion of a task, a budget estimate for completion of a task, resources or types of resources to be used for completion of a task, and the like. The representative 104 may present the proposal to the member 110 via the chat session to solicit a response from the member 110 to either proceed with the proposal or to provide an alternative proposal for completion of the tasks associated with the selected experience.

In an embodiment, the representative 104 can query the resource library to identify one or more third-party services 114 and other services/entities affiliated with the task facilitation service 102 from which to solicit quotes for completion of any of the one or more tasks associated with the selected experience recommendation. For instance, for a particular task associated with the selected experience recommendation, the representative 104 may transmit a job offer to these one or more third-party services 114 and other services/entities. The job offer may indicate various characteristics of the task that is to be completed (e.g., scope of the task, general geographic location of the member 110 or of where the task is to be completed, desired budget, etc.). Through an application or web portal provided by the task facilitation service 102, a third-party service or other service/entity may review the job offer and determine whether to submit a quote for completion of the task or to decline the job offer. If a third-party service or other service/entity opts to reject the job offer, the representative 104 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative 104 may use any provided quotes from the third-party services 114 and/or other services/entities to generate different proposal options for completion of the task associated with the selected experience recommendation. These different proposal options may be presented as a proposal to the member 110 through the task-specific interface corresponding to the particular task that is to be completed. If the member 110 selects a particular proposal option from the set of proposal options presented through the task-specific interface, the representative 104 may transmit a notification to the third-party service or other service/entity that submitted the quote associated with the selected proposal option to indicate that it has been selected for completion of the task.

Once a member 110 has selected a particular proposal for the selected experience, or has selected a button or other GUI element associated with the selected experience to indicate that it wishes to defer to the representative for performance of the tasks related to the selected experience, if any tasks are to be completed using third-party services 116, the representative may coordinate with one or more third-party services 114 for completion of any tasks associated with the selected experience. For instance, if the representative 104 has not solicited any third-party services 114 for performance of a task (e.g., the task does not require quotes from third-party services 114, etc.), the representative 104 may utilize a task coordination system 108 of the task facilitation service 102 to identify and contact one or more third-party services 114 for performance of any tasks associated with the selected experience. In some instances, the representative 104 may access the aforementioned resource library, which may include detailed information related to third-party services 114. For example, an entry for a third-party service in the resource library may include contact information for the third-party service, any available price sheets for services or goods offered by the third-party service (e.g., menus, lodging options, etc.), listings of goods and/or services offered by the third-party service, hours of operation, ratings or scores according to different categories of members, and the like. The representative 104 may query the resource library to identify the one or more third-party services 114 that are to perform any of the tasks associated with the selected experience and determine an estimated cost for performance of the task. Further, the representative 104 may contact the one or more third-party services 114 to coordinate performance of any of the tasks associated with the selected experience for the benefit of the member 110.

In some instances, if a task associated with the selected experience is to be completed by the representative 104, the representative 104 may utilize the task coordination system 108 of the task facilitation service 102 to identify any resources that may be utilized by the representative 104 for performance of the task. As noted above, the resource library may include detailed information related to different resources available for performance of a task. As an illustrative example, if the representative 104 is tasked with obtaining a parking pass for a location where the picnic is to be held, the representative 104 may query the resource library to identify a retailer or service from which the representative 104 may purchase the parking pass on behalf of the member 110 according to the proposal accepted by the member 110. Further, the representative 104 may obtain, from the member profile associated with the member 110, available payment information of the member 110 that may be used to provide payment for any resources required by the representative 104 to complete the task. Using the aforementioned example, the representative 104 may obtain payment information of the member 110 from the member profile to complete a purchase with the retailer for the parking pass that is to be used by the member 110 to access the picnic site.

In some instances, if a particular task associated with the selected experience recommendation cannot be completed by a third-party service or other service/entity according to the estimates provided in the selected proposal, the member 110 may be provided with an option to cancel the particular task or otherwise make changes to the task. For instance, if the new estimated cost for performance of the task exceeds the maximum amount specified in the proposal, the member 110 may ask the representative 104 to find an alternative third-party service or other service/entity for performance of the task within the budget specified in the proposal. For example, if the price for obtaining food for a picnic from the restaurant specified in the proposal exceeds the maximum amount specified in the proposal, the member 110 may ask the representative 104 to identify an alternative restaurant that may provide similar food within the budget specified in the original proposal. Similarly, if the timeframe for completion of the task is not within the timeframe indicated in the proposal, the member 110 can ask the representative to find an alternative third-party service for performance of the task within the original timeframe. The member's interventions may be recorded by the task recommendation system 106 to retrain its corresponding machine learning algorithms or artificial intelligence to better identify third-party services 114 and/or other services/entities that may perform tasks within the defined proposal parameters.

In an embodiment, once the representative 104 has contracted with one or more third-party services 114 for performance of tasks associated with the selected experience, the task coordination system 108 can monitor performance of these tasks by these third-party services 114. For instance, the task coordination system 108 may record any information provided by the third-party services 114 with regard to the timeframe for performance of a task, the cost associated with performance of a task, any status updates with regard to performance of a task, and the like. Status updates provided by third-party services 114 may be provided automatically to the member 110 via the application provided by the task facilitation service 102 and to the representative 104. For instance, if a restaurant that is tasked with preparing food for the member's picnic provides a confirmation number for an order submitted to the restaurant and a timeframe for when the food will be ready for pickup, the task coordination system 108 may provide this information automatically to the member 110 via the application or web portal provided by the task facilitation service 102.

In some instances, the task coordination system 108 may allow a third-party service or other service/entity engaged in performing a task to communicate with the member 110 directly to provide status updates related to the task. For instance, the task coordination system 108 may facilitate a communications channel between the member 110 and the third-party service or other service/entity through which the member 110 and the third-party service or other service/ entity may exchange messages related to the task being performed. This communications channel may be provided through the interface specific to the task such that the communications channel is distinct from the general communications channel between the member 110 and the representative 104 and from any other task-related communications channels between the member 110 and the representative 104. In some instances, the third-party service or other service/entity may be added to the existing task-specific communications channel between the member 110 and the representative 104. This may allow the member 110 and the representative 104 to actively engage the third-party service or other service/entity as the third-party service or other service/entity performs the assigned task.

In an embodiment, if a task associated with the selected experience is to be performed by the representative 104, the task coordination system 108 can monitor performance of the task by the representative 104. For instance, the task coordination system 108 may monitor, in real-time, any communications between the representative 104 and the member 110 regarding the representative's performance of a task associated with the selected experience. These communications may include messages from the representative 104 indicating any status updates with regard to performance of the task, any purchases or expenses incurred by the representative 104 in performing the task, the timeframe for completion of the task, and the like.

In some instances, the representative 104 may automatically provide payment for the services and/or goods provided by the one or more third-party services 114 on behalf of the member 110 or for purchases made by the representative 104 for completion of tasks associated with the selected experience. For instance, during an onboarding process, the member 110 may provide payment information (e.g., credit card numbers and associated information, debit card numbers and associated information, banking information, etc.) that may be used by a representative 104 to provide payment to third-party services 114 or for purchases to be made by the representative 104 for the benefit of the member 110. Thus, the member 110 may not be required to provide any payment information to allow the representative 104 and/or third-party services 114 to initiate performance of tasks for the benefit of the member 110. This may further reduce the cognitive load on the member 110 to manage performance of tasks, including tasks associated with selected experiences.

Once the member 110 has completed the selected experience (e.g., all tasks associated with the selected experience have been performed, etc.), the member 110 may be prompted to provide feedback with regard to the completion of tasks associated with the selected experience and with regard to the selected experience itself. Further, the member 110 may be prompted to provide feedback with regard to the quality of the proposal provided by the representative 104 and as to whether the performance of the tasks associated with the experience resulted in a positive experience for the member 110. Using the responses provided by the member 110, the task facilitation service 102 may train or otherwise update the machine learning algorithms or artificial intelligence utilized by the task recommendation system 106 and the task coordination system 108 to provide better identification of possible experience recommendations and corresponding tasks, creation of proposals, identification of third-party services 114 and/or other services/entities for completion of tasks associated with selected experiences, identification of resources that may be provided to the representative 104 for performance of a task associated with a selected experience, and the like.

It should be noted that for the processes described herein, various operations performed by the representative 104 may be additionally, or alternatively, performed using one or more machine learning algorithms or artificial intelligence. For example, as the representative 104 performs or otherwise coordinates performance of tasks on behalf of a member 110 over time, the task facilitation service 102 may continuously and automatically update the member profile associated with the member 110 according to member feedback related to the performance of these tasks by the representative 104 and/or third-party services 114. In an embodiment, the task recommendation system 106, after a member profile associated with the member 110 has been updated over a period of time (e.g., six months, a year, etc.) or over a set of experience recommendations and tasks (e.g., twenty tasks, thirty tasks, etc.), may utilize a machine learning algorithm or artificial intelligence to automatically and dynamically generate new experience recommendations and corresponding tasks based on the various attributes of the member profile (e.g., historical data corresponding to member-representative communications, member feedback corresponding to representative performance and presented experience recommendations, tasks, proposals, etc.) with or without representative interaction. The task recommendation system 106 may automatically communicate with the member 110 to obtain any additional information required for new tasks associated with new experience recommendations and automatically generate proposals that may be presented to the member 110 for performance of these new tasks. The representative 104 may monitor communications between the task recommendation system 106 and the member 110 to ensure that the conversation maintains a positive polarity (e.g., the member 110 is satisfied with its interaction with the task recommendation system 106 or other bot, etc.). If the representative 104 determines that the conversation has a negative polarity (e.g., the member 110 is expressing frustration, the task recommendation system 106 or bot is unable to process the member's responses or asks, etc.), the representative 104 may intervene in the conversation. This may allow the representative 104 to address any member concerns and perform any tasks on behalf of the member 110.

Thus, unlike automated customer service systems and environments, wherein these systems and environment may have little to no knowledge of the users interacting with agents or other automated systems, the task recommendation system 106 can continuously update the member profile to provide up-to-date historical information about the member 110 based on the member's automatic interaction with the system or interaction with the representative 104 and on the experience recommendations provided to the member 110 and tasks performed on behalf of the member 110 over time. This historical information, which may be automatically and dynamically updated as the member 110 or the system interacts with the representative 104 and as tasks are devised, proposed, and performed for the member 110 overtime, may be used by the task recommendation system 106 to anticipate, identify, and present appropriate or intelligent responses to member 110 queries, needs, and/or goals.

Figure 2:
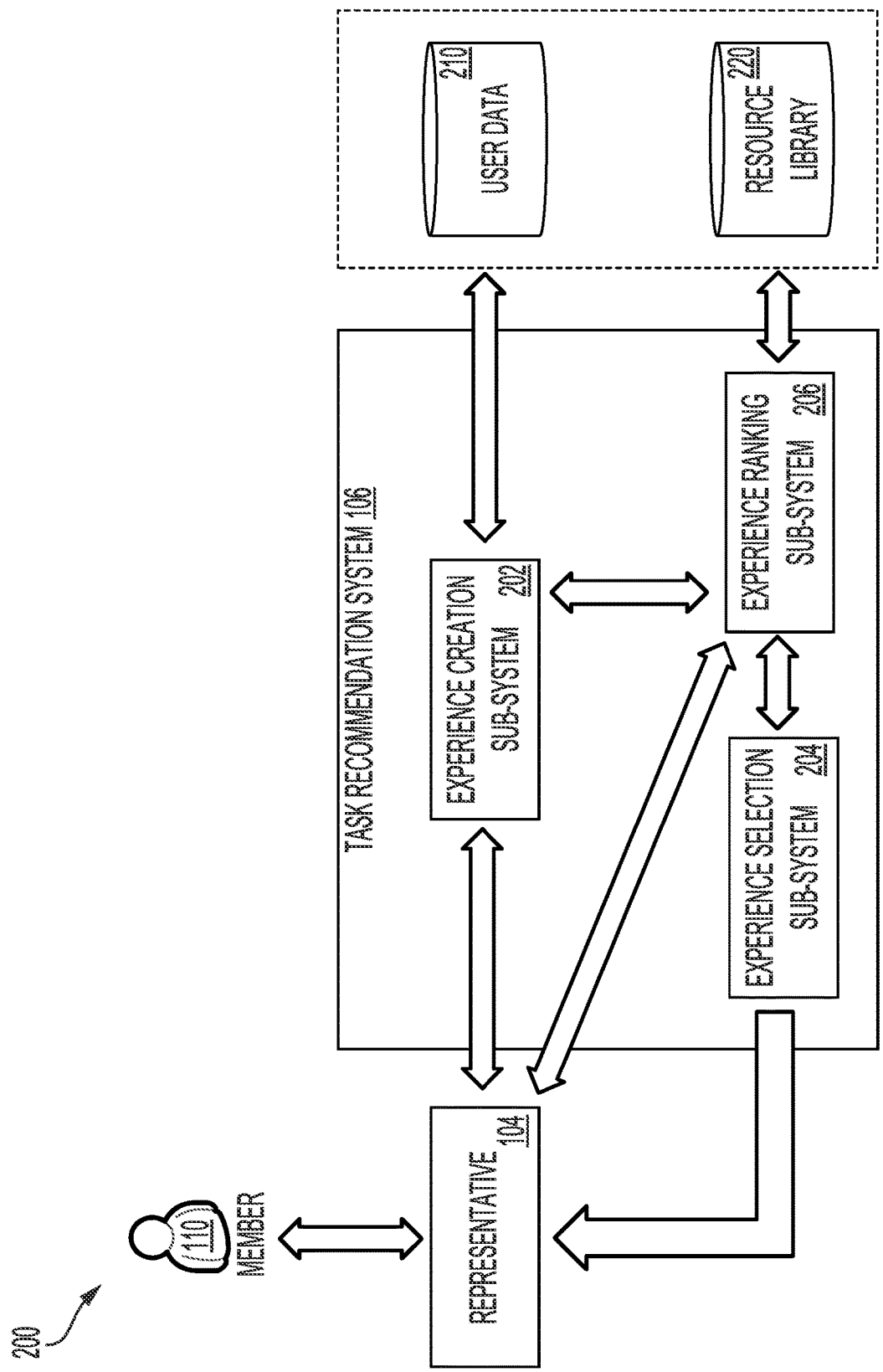
FIG. 2 shows an illustrative example of an environment in which a task recommendation system generates and ranks recommendations for different experiences that can be presented to a member in accordance with at least one embodiment.

FIG. 2 shows an illustrative example of an environment 200 in which a task recommendation system 106 generates and ranks recommendations for different experiences that can be presented to a member 110 in accordance with at least one embodiment. In the environment 200, a representative 104 interacts with an experience creation sub-system 202 of the task recommendation system 106 to generate new experience recommendations that may be provided to members of the task facilitation service, including member 110. The experience creation sub-system 202 may be implemented using a computer system or as an application or other executable code implemented on a computer system of the task recommendation system 106.

In an embodiment, representatives, such as representative 104, are tasked by the task facilitation service to identify experiences that may be made available to members within different geographic markets in which the task facilitation service operates. For instance, the experience creation sub-system 202 may prompt representatives in each geographic market in which the task facilitation service operates to identify any unique and/or time-limited experience opportunities that may be of interest to members of the task facilitation service. The experience creation sub-system 202 may automatically prompt these representatives periodically or in response to a triggering event. For instance, the experience creation sub-system 202 may automatically query each representative, including representative 104, at regular time intervals (e.g., weekly, bi-weekly, monthly, etc.) to identify any available experiences within each geographic market in which the task facilitation service 102 operates. The available experiences may include time-sensitive experiences, experiences subject to limited availability, and the like. Further, available experiences from representatives may include non-pecuniary experiences, such as hikes, walks, and the like.

Additionally, or alternatively, the experience creation sub-system 202 can automatically prompt representatives within a geographic market in response to detecting that the cognitive load for members within this geographic market exceeds a threshold value. In an embodiment, the experience creation sub-system 202 can obtain, from a user datastore 210, member profiles corresponding to members of the task facilitation service within a particular geographic market to determine an average cognitive load of these members. A member profile for a particular member may include identifying information of the corresponding member, as well as an identifier or other information corresponding to the representative assigned to the member. Further, the member profile may include historical data corresponding to communications between the corresponding member and the assigned representative made over time. For instance, as a member interacts with a representative over different chat sessions or data streams corresponding to different tasks and projects, messages exchanged over these chat sessions or data streams may be recorded in the member profile within the user datastore 210.

In an embodiment, the experience creation sub-system 202 can process the aforementioned member profiles using a machine learning algorithm or artificial intelligence to determine the cognitive load of members within each geographic market. For instance, the experience creation sub-system 202 may use member profiles from the user datastore 210, corresponding tasks, and member-representative conversations as input to the machine learning algorithm or artificial intelligence to generate a cognitive load score for each member within a geographic market. The experience creation sub-system 202 can use the cognitive load scores for members within a particular geographic market to determine whether to prompt the representatives within the particular geographic market to identify available experiences that may be recommended to these members. For instance, the experience creation sub-system 202 may determine, based on these cognitive load scores, an average cognitive load score for the particular geographic market. If this average cognitive load score exceeds a maximum cognitive load threshold value for the geographic market, the experience creation sub-system 202 may determine that the average cognitive load is indicative of members within the geographic market experiencing high cognitive loads (e.g., high levels of stress, are too focused on non-enjoyable tasks, etc.). This may cause the experience creation sub-system 202 to automatically prompt the representatives within the geographic market to identify any available experiences that may be offered to members in order to reduce their cognitive load. For instance, the experience creation sub-system 202 may transmit a notification to the representatives within the geographic market to provide any information related to known available experiences within the geographic market to the experience creation sub-system 202 for generation of experience recommendations that may be offered to members of the task facilitation service.

In an embodiment, a representative 104 can submit possible experience recommendations to the experience creation sub-system 202 at any time. For instance, representatives within each geographic market may be aware of possible experiences that may be of interest to members of the task facilitation service based on their knowledge of the geographic market. For instance, if a representative is aware of an upcoming football game in Seattle, the representative may generate a possible experience recommendation related to the upcoming football game. The representative may provide, to the experience creation sub-system 202, the date of the upcoming football game, the price or range of prices for tickets to the upcoming football game, any promotional information related to the upcoming football game, and the like. This information, provided by the representative 104, may be used by the experience creation sub-system 202 to generate a possible experience recommendation that may be offered to members of the task facilitation service within the particular geographic market (e.g., Seattle for the aforementioned football game, etc.).

As noted above, representatives and third-party entities may update the resource library based on their knowledge of upcoming or otherwise available experiences. For example, if a representative identifies a particular experience that may be available within a geographic market (such as in response to an indication that the representative should recommend an experience to a member or through personal knowledge), the representative may create, within the resource library, an entry corresponding to the particular experience. The representative may provide, within the entry, any pertinent information regarding the experience (e.g., a description of the experience, a timeframe during which the experience is available, locations associated with the experience, pricing information, etc.). For example, for the experience corresponding to an upcoming football game in Seattle, the representative may indicate a name for the experience recommendation, a description of the experience (e.g., a Seattle football game, etc.), a timeframe during which the experience is available (e.g., a specific date and time, a range of dates and times, etc.), locations associated with the experience (e.g., geographic location of the football stadium, name of the football stadium, etc.), pricing information (e.g., a range of prices for different tickets available, etc.), and the like. Additionally, the entry may indicate any third-party services or resources that may be utilized to curate the experience. For example, for an experience related to an upcoming football game in Seattle, the entry may be updated to incorporate information related to a third-party ticket broker through which tickets to the football game may be procured. This may allow a representative reviewing this particular experience from the resource library to identify any third-party services or other resources that may be required to secure the experience for a member.

In order to ensure that a provided experience is a valid one, the experience creation sub-system 202 may independently verify (such as through one or more third-party recommendation sources, other representatives within the geographic market associated with the experience, etc.) that the experience is available to members of the task facilitation service and that the experience is one that may be appealing to these members. For instance, if the experience creation sub-system 202 determines that the football game in Seattle is sold out, the experience creation sub-system 202 may determine that the experience is no longer available. Accordingly, the experience creation sub-system 202 may reject the submitted experience recommendation and remove it from the resource library.

In an embodiment, the experience creation sub-system 202 can further obtain possible experience recommendations from one or more third-party sources within each geographic market in which the task facilitation service operates. For instance, the experience creation sub-system 202 can automatically query (periodically and/or in response to a triggering event) various third-party recommendation sources within each geographic market to identify any unique and/or time-limited experience opportunities that may be of interest to members of the task facilitation service. As noted above, the task facilitation service may partner with various organizations within each geographic market that provide or otherwise aggregate different experiences within each geographic market. The available experiences from these third-party recommendation sources may include time-sensitive experiences, experiences subject to limited availability, non-pecuniary experiences, and the like.

In an embodiment, the experience creation sub-system 202 generates, for each identified experience recommendation, a template that indicates what information may be required from a member for planning the experience recommendation and what a proposal for the experience recommendation would look like in order to allow for representatives to easily generate and present the proposal to the member. For instance, the template may incorporate data from the various third-party recommendation sources and representatives that have provided possible experience recommendations to the experience creation sub-system 202. A template corresponding to a particular experience recommendation may make it easier for a representative 104 to complete definition of task(s) associated with the experience recommendation. Templates corresponding to available experience recommendations may be stored within a resource library 220.

The task recommendation system 106 may include an experience ranking sub-system 206 that is configured to generate a ranking of the available experience recommendations that may be presented to a member 110 of the task facilitation service. The experience ranking sub-system 206 may be implemented using a computer system or as an application or other executable code implemented on a computer system of the task recommendation system 106. In an embodiment, the experience ranking sub-system 206 uses the set of available experience recommendations from the resource library 220 and the member profile associated with the member 110 from the user datastore 210 as input to a machine learning algorithm or artificial intelligence to generate an experience recommendation score for each available experience recommendation. The experience recommendation score for a particular experience recommendation may correspond to the probability of the experience recommendation being received positively by a member. Based on the experience recommendation scores generated for the available experience recommendations, the experience ranking sub-system 206 may rank the available experience recommendations according to the probability of the member receiving an experience recommendation positively.

The experience ranking sub-system 206 may generate a ranking of available experience recommendations for a particular member 110 at regular time intervals (e.g., weekly, bi-weekly, monthly, etc.) or in response to a triggering event (e.g., the cognitive load score for the member 110 exceeds a maximum cognitive load score threshold, etc.). For instance, at the start of each time interval (e.g., each week, each bi-week, each month, etc.), the experience ranking sub-system 206 may process the set of available experience recommendations from the resource library 220 and the member profile from the user datastore 210 as input to the aforementioned machine learning algorithm or artificial intelligence to obtain an experience recommendation score for each available experience recommendation. Additionally, or alternatively, the experience ranking sub-system 206 may automatically process the set of available experience recommendations from the resource library 220 and the member profile from the user datastore 210 as input to the aforementioned machine learning algorithm or artificial intelligence in response to detection of the cognitive load score for the member 110 being above the maximum cognitive load score threshold.

In some instances, the experience ranking sub-system 206 may generate the ranking of available experience recommendations for the member 110 in response to a request from the representative 104 for experience recommendations that may be presented to the member 110. For example, if the representative 104, based on conversations with the member 110 over the chat session and/or based on knowledge of the member 110 garnered through repeated conversations and task performance for the member 110, determines that the member 110 should be offered one or more experience recommendations to give the member 110 an opportunity to relax or otherwise reduce its cognitive load, the representative 104 can submit a request to the experience ranking sub-system 206 to generate a ranking of available experience recommendations for the member 110. This ranking may allow the representative to pick which experience recommendations may be presented to the member 110, as described in greater detail herein.

In an embodiment, the experience ranking sub-system 206 can utilize NLP or other artificial intelligence to evaluate received messages or other communications from the member 110 to determine whether to generate a ranking of available experience recommendations to allow for selection of one or more experience recommendations that can be presented to the member 110. For instance, the experience ranking sub-system 206 may process any incoming messages from the member 110, as well as any historical conversations stored in the user datastore 210, using NLP or other artificial intelligence to detect a request from the member 110 to receive one or more experience recommendations. As an illustrative example, if the member 110 states, via the chat session with the representative 104, that "I'm interested in getting away this weekend," the experience ranking sub-system 206 may determine, using NLP or other artificial intelligence, that the member 110 is seeking experience recommendations for available experiences that the member 110 may partake in during the upcoming weekend. Accordingly, the experience ranking sub-system 206 may obtain the available experience recommendations from the resource library 220, as well as the member profile associated with the member 110 from the user datastore 210, to generate the ranked listing of available experience recommendations for the member 110 according to the member's preferences (as defined in the member profile) and/or criteria provided by the member 110 in its request.

In an embodiment, the experience ranking sub-system 206 provides the ranked list of available experience recommendations to an experience selection sub-system 204 to select one or more available experience recommendations that can be automatically presented to the member 110. The experience selection sub-system 204 may be implemented using a computer system or as an application or other executable code implemented on a computer system of the task recommendation system 106. The experience selection sub-system 204 may be configured to select, from the ranked list of experience recommendations, one or more experience recommendations that may be presented to the member 110 by the representative 104 or automatically by the experience selection sub-system 204. For instance, if the application or web portal provided by the task facilitation service is configured to present, to the member 110, a limited number of experience recommendations from the ranked list of available experience recommendations, the experience selection sub-system 204 may process the ranked list of available experience recommendations and the member profile from the user datastore 210 to determine which experience recommendations should be presented to the member 110. In some instances, the selection made by the experience selection sub-system 204 may correspond to the ranking of the available experience recommendations in the list. Alternatively, the experience selection sub-system 204 may process the ranked list of the available experience recommendations, as well as the member's experience recommendation selection history as indicated in the member profile (e.g., experience recommendations previously presented to the member 110, experience recommendations accepted by the member 110, experience recommendations rejected by the member 110, feedback related to previously presented experience recommendations, etc.), to determine which experience recommendations may be presented to the member 110. For instance, if the ranked list of the available experience recommendations includes an experience recommendation corresponding to a particular hike but the member 110 has recently partaken in the particular hike, the experience selection sub-system 204 may forego selection of the experience recommendation corresponding to the particular hike, as this may be received by the member 110 as being repetitive. Thus, the experience selection sub-system 204 may provide another layer to further refine the ranked list of the available experience recommendations for presentation to the member 110.

The experience selection sub-system 204 may provide, to the representative 104, a new listing of available experience recommendations that may be presented to the member 110. The representative 104 may evaluate the ranked listing of available experience recommendations and, based on its knowledge of the member 110, select one or more available experience recommendations that may be presented to the member 110. The representative's manual selection of one or more experience recommendations, as well as member feedback related to the presentation of these one or more experience recommendations may be recorded and used by the experience ranking sub-system 206 to further train the machine learning algorithm or artificial intelligence used to rank available experience recommendations for the member 110. As an illustrative example, if the representative 104 selects a particular experience recommendation that has a relatively low experience recommendation score, and the member 110 responds positively to the particular experience recommendation, the experience ranking sub-system 206 may use this data to train the machine learning algorithm or artificial intelligence to more accurately determine a positive (e.g., higher) experience recommendation score for similar experience recommendations.

In an embodiment, if the member 110 rejects a presented experience recommendation, the representative 104 or the task recommendation system 106 can solicit feedback from the member 110 with regard to its decision to reject the experience recommendation. For example, in response to a member's rejection of a presented experience recommendation, the representative 104 or the task recommendation system 106 may ask the member 110 why they have opted to reject the experience recommendation. Additionally, or alternatively, the representative 104 or the task recommendation system 106 may prompt the member 110 to rate or provide a score for the presented experience recommendation to indicate their sentiment with regard to the presented experience recommendation. The presented experience recommendation, the member profile associated with the member 110 from the user datastore 210, and any feedback provided by the member 110 may be processed by the experience ranking sub-system 206 using the machine learning algorithm or artificial intelligence to further train the machine learning algorithm or artificial intelligence to provide experience recommendations that are more likely to be selected by the member 110 and other similarly situated members of the task facilitation service.

Figure 3:
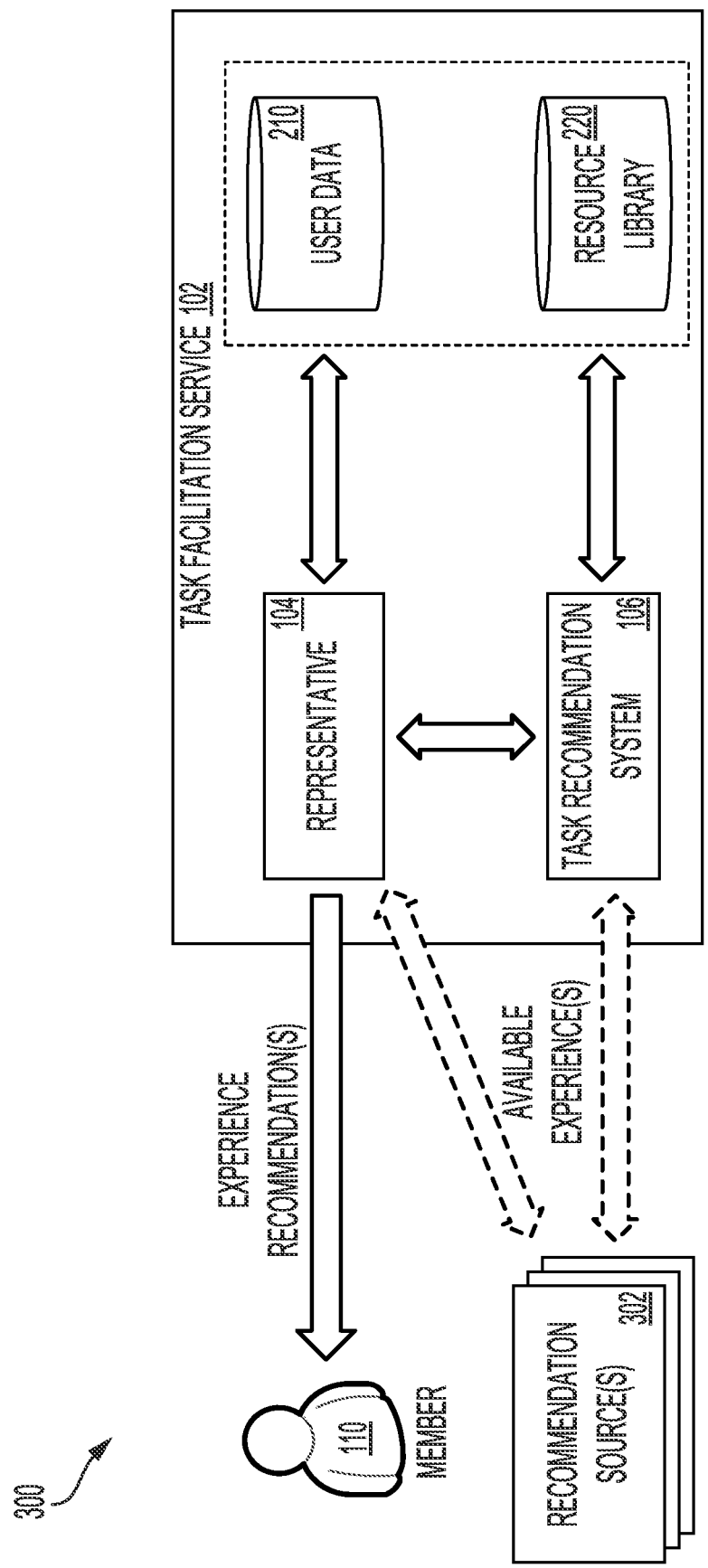
FIG. 3 shows an illustrative example of an environment in which experience recommendations are provided to a member by a representative associated with the task facilitation service based on a ranking of available recommendations in accordance with at least one embodiment.

FIG. 3 shows an illustrative example of an environment 300 in which experience recommendations are provided to a member 110 by a representative 104 associated with the task facilitation service 102 based on a ranking of available recommendations in accordance with at least one embodiment. As noted above, the task recommendation system 106 can generate a ranked list of available experience recommendations that may be used by the representative 104 to select one or more experience recommendations that may be presented to the member 110. Alternatively, the task recommendation system 106 may automatically select, from the ranked list of available experience recommendations, one or more experience recommendations that may be presented to the member 110.

As noted above, the task recommendation system 106 may identify a set of available experience recommendations by querying representatives, including representative 104, in the various geographic markets in which the task facilitation service 102. These representatives may identify these available experience recommendations via one or more experience recommendation sources 302. The one or more experience recommendation sources 302 may include various third-party recommendation sources within each geographic market in which the task facilitation service 102 operates. For instance, the task facilitation service 102 may partner with various organizations within each geographic market that provide or otherwise aggregate different experiences within each geographic market, such as a publisher of a luxury and lifestyle travel magazine, different online marketplaces for events, lodging, and the like. Each of these experience recommendation sources 302 may provide or otherwise maintain information related to unique and/or time-limited experience opportunities that may be of interest to members of the task facilitation service 102.

As noted above, representatives, such as representative 104, may be tasked by the task facilitation service 102 to identify experiences that may be made available to members within different geographic markets in which the task facilitation service 102 operates. For instance, the task facilitation service 102 may query representatives in each geographic market in which the task facilitation service 102 operates to identify any unique and/or time-limited experience opportunities that may be of interest to members of the task facilitation service 102. In response to this query, a representative 104 may access one or more experience recommendation sources 302 to identify any available experience recommendations that may be of interest to the member 110 and other members of the task facilitation service 102. Additionally, or alternatively, the representative 104 may provide any experience recommendations that they may be aware of and that may be of interest to members of the task facilitation service 102 based on their knowledge of the geographic market. A representative 104 may provide information related to each of these available experiences to the task recommendation system 106 to generate possible experience recommendations that may be offered to members of the task facilitation service 102 within the particular geographic market.

As noted above, a representative 104 may update a resource library 220 maintained by the task facilitation service 102 to provide new experiences that may be made available to members of the task facilitation service 102. For instance, independent of a query from the task facilitation service 102 to identify any unique and/or time-limited experience opportunities, a representative 104 may have personal knowledge of experiences that may be available within the representative's geographic market and/or elsewhere. Accordingly, the representative 104 may create, within the resource library 220, an entry corresponding to a new experience that the representative 104 may be aware of. For a particular experience, the representative 104 may provide a description of the experience, a timeframe during which the experience may be available to members, locations associated with the experience, pricing information, and the like. Further, if the representative 104 utilized any experience recommendation sources 302 to obtain information associated with the new experience being entered into the resource library 220, the representative 104 may indicate these experience recommendation sources 302 within the entry for the experience. This may allow a representative reviewing this particular experience from the resource library 220 to identify any third-party services or other resources that may be required to secure the experience for a member.

In an embodiment, the task recommendation system 106 generates, for each identified experience recommendation, a template that indicates what information may be required from a member 110 for planning an experience recommendation and what a proposal for the experience recommendation would look like in order to allow for representatives to easily generate and present the proposal to the member 110. For instance, the template may incorporate data from the various experience recommendation sources 302. A template corresponding to a particular experience recommendation may make it easier for a representative 104 to complete definition of task(s) associated with the experience recommendation. The task recommendation system 106 may store the template in the task datastore 220, which may be used by the representative 104 to access the template and generate tasks and/or proposals related to a particular experience, as described in greater detail herein.

As noted above, the task recommendation system 106 can generate a ranking of the available experience recommendations that may be presented to the member 110 based on the member's profile and/or other member attributes as defined in the user datastore 210. Further, based on the ranking of the available experience recommendations, the task recommendation system 106 may select one or more experience recommendations that can be presented to the member 110. This selection may be performed at regular time intervals or in response to a triggering event. The selection may include a number of the highest ranked experience recommendations. For instance, the number of selected experience recommendations may be determined based on member preferences. In some instances, the task recommendation system 106 can control how many experience recommendations may be presented at any given time, as well as to when these experience recommendations may be presented. For instance, the task recommendation system 106 may present one or more of the selected experience recommendations upon detection of the member's cognitive load score exceeding a threshold value. As another example, the task recommendation system 106 may present one or more of the selected experience recommendations automatically in response to a member request.

In some instances, the task recommendation system 106 may provide the ranked listing of available experience recommendations to the representative 104 to allow the representative 104 to select which experience recommendations may be presented to the member 110. The representative 104 may evaluate the ranked listing of available experience recommendations and, based on its knowledge of the member 110, select one or more available experience recommendations that may be presented to the member 110. The representative's manual selection of one or more experience recommendations, as well as member feedback related to the presentation of these one or more experience recommendations may be recorded in the user datastore 210 and used by the task recommendation system 106 to further train a machine learning algorithm or artificial intelligence used to rank available experience recommendations for the member 110, as noted above.

The task recommendation system 106 may display, via an interface provided by the task facilitation service 102, one or more experience recommendations to the member 110. Through the interface, the member 110 may determine the parameters of the one or more experience recommendations and determine whether to further engage with any of the one or more experience recommendations. If the member 110 rejects an experience recommendation, the task recommendation system 106 may record the member's rejection of the experience recommendation within the member's profile stored in the user datastore 210. The task recommendation system 106 may use this rejection to further train the machine learning algorithm or artificial intelligence used to rank available experience recommendations for the member 110 such that similar experience recommendations are less likely to be selected and presented to the member 110. Further, if the member 110 rejects a presented experience recommendation, the representative 104 or the task recommendation system 106 can solicit feedback from the member 110 with regard to its decision to reject the experience recommendation. The presented experience recommendation, the member profile associated with the member 110, and any feedback provided by the member 110 may be processed using the machine learning algorithm or artificial intelligence to further train the machine learning algorithm or artificial intelligence to provide experience recommendations that are more likely to be selected by the member 110 and other similarly situated members of the task facilitation service 102.

Figure 4:
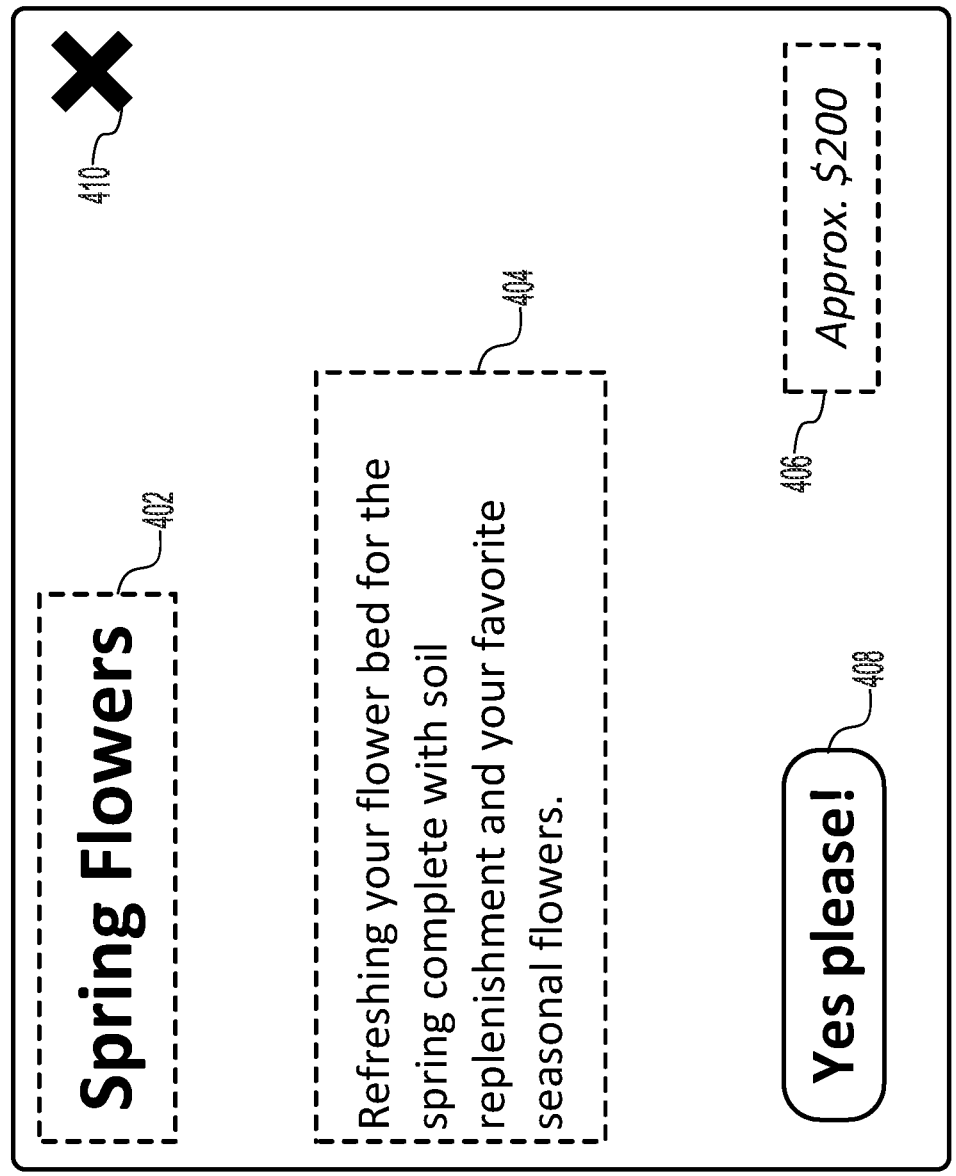
FIG. 4 shows an illustrative example of a recommendation presented to a member via an interface of the task facilitation service in accordance with at least one embodiment.

FIG. 4 shows an illustrative example of a recommendation 400 presented to a member via an interface of the task facilitation service in accordance with at least one embodiment. An experience 400 can include various elements that allow for a member to determine the parameters of the experience recommendation provided by the representative or task recommendation system. For example, as illustrated in FIG. 4, the experience 400 can include a descriptive title 402 for the experience 400 (e.g., "Spring Flowers"). The descriptive title 402 may be generated by the representative or the task recommendation system when generating the template corresponding to the experience recommendation. For instance, the representative or the task recommendation system may review information associated with the available experience from the resource library and, based on this information, generate the descriptive title 402 for the experience 400. Alternatively, if an entry within the resource library corresponding to the experience includes the descriptive title 402, the representative or task recommendation system may use the provided descriptive title 402 for the experience 400.

In an embodiment, the task facilitation service can use a machine learning algorithm or artificial intelligence to generate the descriptive title 402 for the experience 400. For instance, the task facilitation service may use, as input, information provided by the representative or task recommendation system for the experience recommendation (e.g., any information obtained from the resource library, any information provided by the representative manually, etc.) and any feedback from members of the task facilitation service related to historical experience recommendations provided to these members to determine a descriptive title 402 for the experience 400. The machine learning algorithm or artificial intelligence may be trained using supervised training techniques. For instance, a dataset of experience recommendations, corresponding descriptive titles, and feedback related to the descriptive titles and experience recommendations can be selected for training of the machine learning algorithm or artificial intelligence. The machine learning algorithm or artificial intelligence may be evaluated to determine, based on the sample inputs supplied to the machine learning algorithm or artificial intelligence, whether the machine learning algorithm or artificial intelligence is producing accurate descriptive titles for experience recommendations. Based on this evaluation, the machine learning algorithm or artificial intelligence may be modified to increase the likelihood of the machine learning algorithm or artificial intelligence generating the desired results. The machine learning algorithm or artificial intelligence may further be dynamically trained by soliciting feedback from members and representatives with regard to the descriptive titles provided by the machine learning algorithm or artificial intelligence for each experience recommendation. For instance, if a representative or member indicates that a descriptive title for a presented experience does not appear to accurately describe the presented experience, the machine learning algorithm or artificial intelligence may be modified using this feedback to increase the likelihood of accurate descriptive titles being generated by the machine learning algorithm or artificial intelligence.

An experience 400 presented to a member may further include a short description 404 related to the experience 400 being offered to the member. The short description 404 may be generated such that it is easily digestible by members of the task facilitation service. For instance, the short description 404 may be limited to a single sentence providing a description of the recommended experience 400. Additionally, or alternatively, the short description 404 may be limited to a set number of characters (e.g., 100 characters, etc.) to allow a member to quickly determine the scope of the recommended experience 400 and determine whether to proceed with the recommended experience 400 or to reject the recommended experience 400. The short description 404 may be provided by a representative based on their knowledge of the experience 400 that is being offered. For instance, the representative may review information provided in an entry corresponding to a particular experience in the resource library and generate a summary of the particular experience based on this information. This summary may be included in the template for the particular experience in the form of the short description 404. Thus, when the experience is presented, the task recommendation system or representative may insert this short description 404 from the template into the experience 400.

Similar to the creation of the descriptive title 402, the task facilitation service can use a machine learning algorithm or artificial intelligence to generate the short description 404 by using, as input, information provided by the representative or task recommendation system for the experience recommendation and any feedback from members of the task facilitation service related to historical experience recommendations provided to these members. As output, the machine learning algorithm or artificial intelligence can provide the short description 404 that is to be provided with a corresponding experience 400 when presented to a member. The short description 404 may include additional information that may be of relevance for the member. For instance, if the experience 400 corresponds to a picnic with food being catered by a particular restaurant, the short description 404 may indicate the name of this particular restaurant to allow the member to determine whether to approve/reject the experience 400 or to request a different restaurant for the experience 400.

The experience 400 may further specify an estimated cost 406 that may be incurred by the member to partake in the experience 400. The estimated cost 406 may be provided based on information obtained from the entry corresponding to the experience within the resource library or by a representative based on their knowledge of the particular experience. For instance, if a representative is aware of an upcoming baseball game within the New York City metropolitan area, the representative may indicate the price or range of prices for tickets to the upcoming baseball game. This information, provided by the representative, may be used by the task facilitation service to define the estimated cost 406 for the experience 400 that may be offered to a member. In some instances, the task facilitation service, via the task recommendation system, may automatically process information from either the representative or from the resource library to discern an estimated cost 406 for the experience 400. For instance, if the representative or the entry corresponding to the experience within the resource library provides a range of prices for different elements of the experience (e.g., parking costs, ticket costs, meal costs, etc.), the task facilitation service may aggregate these ranges of prices for the different elements of the experience and automatically calculate an approximate price or range of prices for the complete experience 400. This approximate price or range of prices may be presented to the member as the estimated cost 406 for the experience 400.

As noted above, a representative may query the resource library to identify one or more third-party services and other services/entities affiliated with the task facilitation service from which to solicit quotes for completion of any tasks associated with an experience recommendation. In an embodiment, a representative can obtain initial quotes from these third-party services and other services/entities to determine the estimated cost 406 for the experience 400. For example, for a particular experience, the representative may transmit a job offer corresponding to one or more possible tasks that may be performed for the experience 400. The job offer may indicate various characteristics of the possible tasks that may be completed for fulfillment of the experience (e.g., scope of the possible tasks, general geographic location of the member or of where the task is to be completed, etc.). In some instances, the job offer may indicate a general overview of the experience 400 that may be recommended to members of the task facilitation service. For example, the job offer may simply provide the short description 404 that is to be provided with a corresponding experience 400 when presented to a member. This may allow a receiving third-party service or other service/entity affiliated with the task facilitation service to provide any information corresponding to possible tasks that may be performed by the third-party service or other service/entity as part of the experience 400. For example, referring to the "Spring Flowers" example illustrated in FIG. 4, the representative may transmit a job offer to one or more florists and to one or more landscaping companies to obtain information corresponding tasks that may be performed to facilitate the recommendation. A florist, for instance, may provide a quote detailing the one or more tasks that may be performed to provide any number of flowers and/or other plants for the member's garden, as well as an estimate for providing these flowers and/or other plants. Further, a landscaping company may provide a quote detailing the one or more tasks that may be performed to ensure that the provided flowers and/or other plants are planted properly within the member's garden, as well as an estimate for performing these landscaping tasks.

Any quotes provided by third-party services and/or other services/entities affiliated with the task facilitation service may be used to determine the estimated cost 406 for the experience 400. For example, the representative or the task facilitation service may aggregate any obtained quotes from third-party services and/or other services/entities associated with the task facilitation service to identify what tasks may be performed by these third-party services and/or other services/entities to facilitate the experience 400. Based on the provided quotes and corresponding tasks, the representative or the task facilitation service may determine a range of costs that may be incurred in order to facilitate the experience 400. The estimated cost 406, in some instances, may correspond to a maximum estimated cost for facilitation of the experience 400. Alternatively, the estimated cost 406 may correspond to an average estimated cost based on the provided quotes. In some instances, as opposed to a singular estimated cost (as illustrated using estimated cost 406 in FIG. 4), the representative or task facilitation service may provide an estimated cost range, which may include the minimum and maximum estimated cost for facilitation of the experience 400, as determined based on the obtained quotes.

In an embodiment, the experience 400 can further include a GUI element 408 (e.g., "Yes please!" button, as illustrated in FIG. 4) that may be used by the member to indicate that they wish to learn more about the experience 400 or to partake in the experience 400. If a member selects the GUI element 408, the representative assigned to the member may receive a notification indicating that the member has opted to learn more about the recommended experience 400. In response to the notification, the representative, via a chat or other communications session established between the member and the representative for the particular experience 400, may provide additional details related to the recommended experience. For instance, the representative may refer to the template corresponding to the particular experience 400 to obtain any additional information that is available for the experience.

In some instances, selection of the GUI element 408 may cause the task facilitation service to automatically generate a new interface corresponding to the experience 400. This new interface may service as a project-specific interface corresponding to the experience 400 that is to be curated for the benefit of a member. As noted above, this project-specific interface may be presented to the member through the web portal or application provided by the task facilitation service as a separate interface from other interfaces provided by the task facilitation service. Through this project-specific interface, the task facilitation service may provide a specific chat or other communications session corresponding to the experience. This specific chat or other communications session corresponding to the experience may be distinct from the chat session previously established between the member and the representative. Through this project-specific chat or other communications session, the member and the representative may exchange messages related to the particular experience. In addition to providing a project-specific chat or other communications session, the project-specific interface may provide a description of the particular experience, as well as information corresponding to different tasks that may be performed in order to complete the experience for the member. Further, for each task associated with the experience, the task facilitation service may provide an additional task-specific interface accessible through the project-specific interface. Each task-specific interface may include a detailed description of the particular task that is to be performed as part of the experience. Further, the task-specific interface may provide a task-specific chat or other communications session through which the member and the representative may exchange messages related to the particular task being performed as part of the experience.

As noted above, if the member indicates that it wishes to learn more about the recommended experience 400, the task facilitation service can evaluate the member profile associated with the member to determine how much information is to be provided to the member without increasing the likelihood of cognitive overload for the member. For instance, if the member has a propensity to delegate tasks to the representative and generally delegates all aspects of a task to the representative, the task facilitation service may provide basic information associated with the task (e.g., short task description, estimated completion time for the task, etc.). However, if the member is more detail oriented and is heavily involved in the completion of tasks, the task facilitation service may provide more information associated with the experience 400 (e.g., detailed task descriptions for tasks associated with the experience recommendation, steps to be performed to complete these tasks, any budget information for the tasks, etc.). Further, as noted above, the task facilitation service can utilize a machine learning algorithm or artificial intelligence to determine how much information related to an experience 400 should be presented to the member. For instance, the task facilitation service may use the member's profile and data corresponding to the tasks associated with the selected experience recommendation as input to a machine learning algorithm or artificial intelligence. The resulting output may provide a recommendation as to what information regarding the tasks associated with the experience recommendation should be presented to the member. In some instances, the recommendation can be provided to the representative, which may evaluate the recommendation and determine what information may be presented to the member for the selected experience recommendation. When information for an experience recommendation is provided to the member, the task facilitation service may monitor member interaction with the representative to identify the member's response to the presentation of the information. The response may be used to further train the machine learning algorithm or artificial intelligence to provide better recommendations with regard to information that may be presented to members of the task facilitation service.

The experience 400 may further include a rejection GUI element 410 (e.g., an "X" or cancellation button, etc.), which the member may utilize to reject the experience 400. If the member rejects the experience 400, such as through selection of the rejection GUI element 410, the task facilitation service may record the member's rejection to the experience 400 within the member's profile and within an entry in the task datastore corresponding to the experience 400. The task facilitation service may use this rejection to further train the machine learning algorithm or artificial intelligence used to rank available experience recommendations for the member, as described above, such that similar experience recommendations are less likely to be selected and presented to the member.

Figure 5:
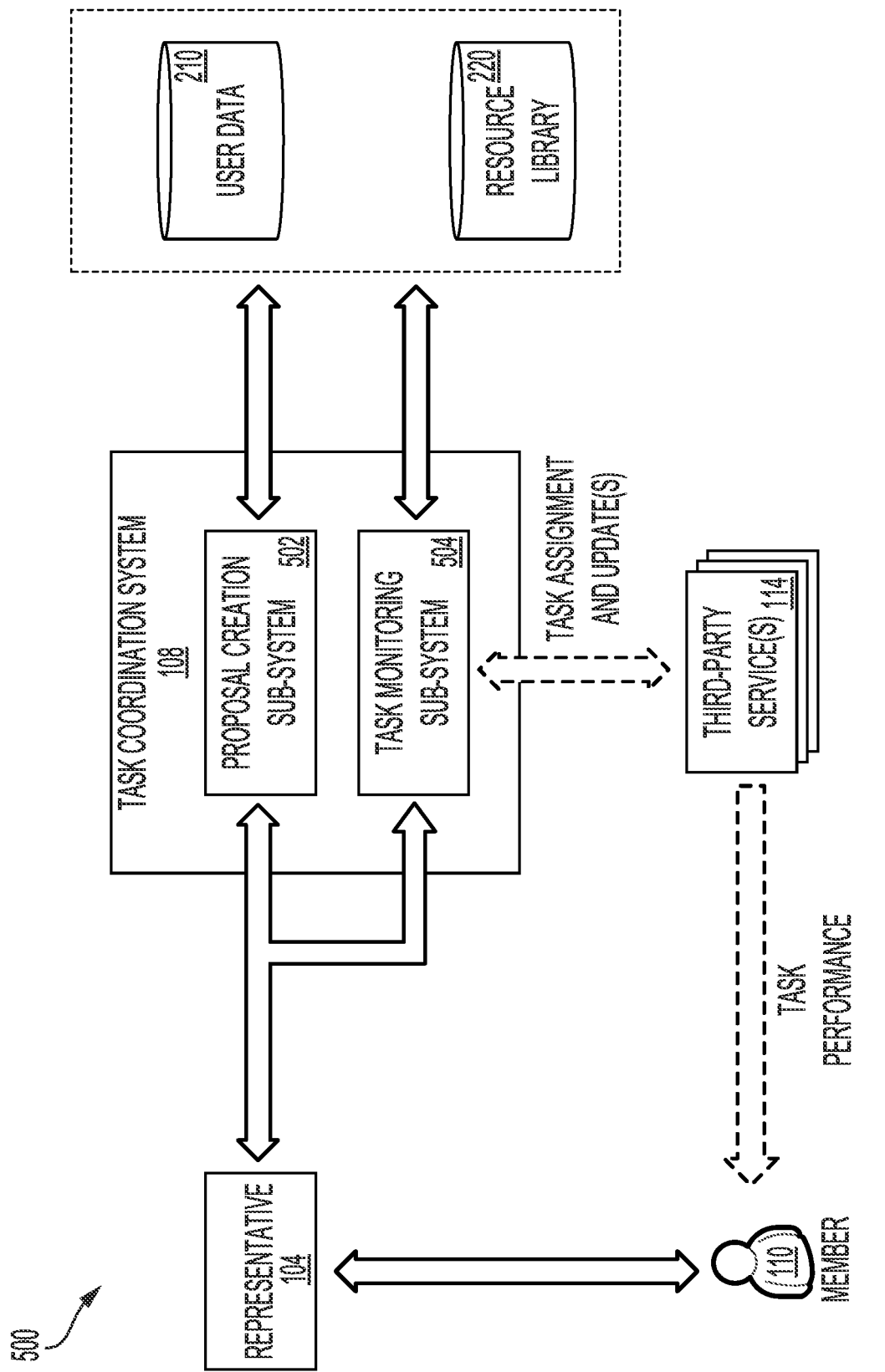
FIG. 5 shows an illustrative example of an environment in which a task coordination system assigns and monitors performance of a task associated with a selected experience by a representative and/or one or more third-party services in accordance with at least one embodiment.

FIG. 5 shows an illustrative example of an environment 500 in which a task coordination system 108 assigns and monitors performance of a task associated with a selected experience by a representative 104 and/or one or more third-party services 114 in accordance with at least one embodiment. In the environment 500, a representative 104 may access a proposal creation sub-system 502 of the task coordination system 108 to generate a proposal for a selected experience recommendation and corresponding tasks. The proposal creation sub-system 502 may be implemented using a computer system or as an application or other executable code implemented on a computer system of the task coordination system 108. Once the representative 104 has obtained the necessary experience-related information from the member 110 (such as through soliciting information from the member 110 as indicated in the template for the experience, etc.), the representative 104 can utilize the proposal creation sub-system 502 to generate one or more proposals for curation of the selected experience.

A proposal may include one or more options presented to a member 110 that may be created and/or collected by a representative 104 while researching tasks related to a selected experience. In some instances, a representative 104 may access, via the proposal creation sub-system 502, one or more templates that may be used to generate these one or more proposals. For example, the proposal creation sub-system 502 may maintain, within the resource library 220 or internally, proposal templates for each available experience, whereby a proposal template for a particular available experience may include various data fields associated with the available experience and corresponding tasks.

In an embodiment, the data fields within a proposal template can be toggled on or off to provide a representative 104 with the ability to determine what information is presented to the member 110 in a proposal. The representative 104, based on its knowledge of the member's preferences, may toggle on or off any of these data fields within the template. For example, if the representative 104 has established a relationship with the member 110 whereby the representative 104, with high confidence, knows that the member trusts the representative 104 in selecting reputable businesses for tasks related to the selected experience, the representative 104 may toggle off a data field corresponding to the ratings/reviews for corresponding businesses from the proposal template. Similarly, if the representative 104 knows that the member 110 is not interested in the location/address of a business for the purpose of the proposal, the representative 104 may toggle off the data field corresponding to the location/address for corresponding businesses from the proposal template. While certain data fields may be toggled off within the proposal template, the representative 104 may complete these data fields to provide additional information that may be used by the proposal creation sub-system 502 to supplement proposals maintained within the resource library 220.

In an embodiment, the proposal creation sub-system 502 utilizes a machine learning algorithm or artificial intelligence to generate recommendations for the representative 104 regarding data fields that may be presented to the member 110 in a proposal. The proposal creation sub-system 502 may use, as input to the machine learning algorithm or artificial intelligence, a member profile or model associated with the member 110 from the user datastore 210, historical task and experience data for the member 110 from the resource library 220, and information corresponding to the experience and tasks for which a proposal is being generated (e.g., an experience type or category, task types or categories, etc.). The output of the machine learning algorithm or artificial intelligence may specify which data fields of a proposal template should be toggled on or off. The proposal creation sub-system 502, in some instances, may preserve, for the representative 104, the option to toggle on these data fields in order to provide the representative 104 with the ability to present these data fields to the member 110 in a proposal. For example, if the proposal creation sub-system 502 has automatically toggled off a data field corresponding to the estimated cost for the experience, but the member 110 has expressed an interest in the possible cost involved, the representative 104 may toggle on the data field corresponding to the estimated cost.

Once the representative 104 has generated a new proposal for the member 110, the representative 104 may present the proposal and any corresponding proposal options to the member 110. Further, the proposal creation sub-system 502 may store the new proposal in the user datastore 210 in association with a member profile in the user datastore 210. In some instances, when a proposal is presented to a member 110, the proposal creation sub-system 502 may monitor member interaction with the representative 104 and with the proposal to obtain data that may be used to further train the machine learning algorithm or artificial intelligence. For example, if a representative 104 presents a proposal without any ratings/reviews for a particular business based on the recommendation generated by the proposal creation sub-system 502, and the member 110 indicates (e.g., through messages to the representative 104, through selection of an option in the proposal to view ratings/reviews for the particular business, etc.) that they are interested in ratings/reviews for the particular business, the proposal creation sub-system 502 may utilize this feedback to further train the machine learning algorithm or artificial intelligence to increase the likelihood of recommending presentation of ratings/reviews for businesses selected for similar experiences and tasks/task types.

As noted above, the resource library 220 may be used to automatically populate one or more data fields of a particular proposal template. The resource library 220 may include entries corresponding to businesses and/or products previously used by representatives for proposals related to particular tasks or task types associated with different experiences or experience types. For instance, when a representative 104 generates a proposal for a task related to catering food for a picnic near Lynnwood, Washington, the proposal creation sub-system 502 may obtain information associated with a restaurant selected by the representative 104, and as presented in the experience recommendation provided to the member 110, for the task. The proposal creation sub-system 502 may generate an entry corresponding to the restaurant in the resource library 220 and associate this entry with "picnic" and "Lynnwood, Washington" Thus, if another representative receives a task corresponding to an experience involving a picnic for a member located near Lynnwood, Washington, the other representative may query the resource library 220 for restaurants near Lynnwood, Washington that may be able to provide catering for the picnic. The resource library 220 may return, in response to the query, an entry corresponding to the restaurant previously selected by the representative 104. If the other representative selects this restaurant, the proposal creation sub-system 502 may automatically populate the data fields of the proposal template with the information available for the restaurant from the resource library 220.

In an embodiment, the representative 104 can query the resource library 220 to identify one or more third-party services 114 and other services/entities affiliated with the task facilitation service from which to solicit quotes for completion of tasks associated with the experience. For instance, for a newly created task associated with an experience, the representative 104 may transmit a job offer to these one or more third-party services 114 and other services/entities. The job offer may indicate various characteristics of the task that is to be completed (e.g., scope of the task, general geographic location of the member 110 or of where the task is to be completed, desired budget, etc.). Through an application or web portal provided by the task facilitation service, a third-party service or other service/entity may review the job offer and determine whether to submit a quote for completion of the task or to decline the job offer. If a third-party service or other service/entity opts to reject the job offer, the representative 104 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

As noted above, when creating an experience recommendation for the member 110, the representative 104 may transmit a job offer to one or more third-party services and/or other services/entities associated with the task facilitation service to solicit quotes for possible tasks that may be performed as part of the experience. These quotes may be used by the representative 104 or the task facilitation service to determine an estimated cost associated with the experience recommendation provided to the member 110. If the estimated cost associated with the experience recommendation was determined in this manner, the representative 104 may transmit a notification to the one or more third-party services and/or other services/entities associated with the task facilitation service to determine whether the previously provided quotes are still valid and to determine whether these one or more third-party services and/or other services/ entities are still able to perform the specified tasks. This may allow the one or more third-party services and/or other services/entities to determine whether they would like to proceed with the job offer, make any revisions to previously provided quotes for performance of tasks, or to rescind a previously provided quote and withdraw from performing the tasks.

The representative 104 may use any provided quotes from the third-party services 114 and/or other services/entities to generate different proposal options for completion of the task. These different proposal options may be presented as a proposal to the member 110 through the task-specific interface corresponding to the particular task that is to be completed. If the member 110 selects a particular proposal option from the set of proposal options presented through the task-specific interface, the representative 104 may transmit a notification to the third-party service or other service/ entity that submitted the quote associated with the selected proposal option to indicate that it has been selected for completion of the task.

As noted above, the representative 104, via a proposal template, may generate additional proposal options for businesses and/or products that may be used for completion of tasks related to a selected experience. For instance, for a particular proposal, the representative 104 may generate a recommended option, which may correspond to the business or product that the representative 104 is recommending for completion of a task corresponding to a selected experience. Additionally, in order to provide the member 110 with additional options or choices, the representative 104 can generate additional options corresponding to other businesses or products that may be used to complete the task. In some instances, if the representative 104 knows that the member 110 has delegated the decision-making with regard to completion of a task to the representative 104, the representative 104 may forego generation of additional proposal options outside of the recommended option. However, the representative 104 may still present, to the member 110, the selected proposal option for completion of the task in order to keep the member 110 informed about the status of the task.

Once the representative 104 has completed defining a proposal via use of a proposal template, the representative 104 may present the proposal to the member 110 through the application or web portal provided by the task facilitation service. In some instances, the representative 104 may transmit a notification to the member 110 to indicate that a proposal has been prepared for a particular experience and that the proposal is ready for review via the application or web portal provided by the task facilitation service. The proposal presented to the member 110 may indicate the task(s) related to the selected experience for which the proposal was prepared, as well as an indication of the one or more options that are being provided to the member 110. For instance, the proposal may include links to the recommended proposal option and to the other options (if any) prepared by the representative 104 for the particular experience. These links may allow the member 110 to navigate amongst the one or more options prepared by the representative 104 via the application or web portal. In some instances, the representative 104 may transmit the proposal to the member 110 via other communication channels, such as via e-mail, text message, and the like.

For each proposal option, the member may be presented with information corresponding to the business or product selected by the representative 104 and corresponding to the data fields selected for presentation by the representative 104 via the proposal creation sub-system 502. In some instances, the member 110 may select what details or data fields associated with a particular proposal are presented via the application or web portal. For example, if the member 110 is presented with the estimated total for each proposal option and the member 110 is not interested in reviewing the estimated total for each proposal option, the member 110 may toggle off this particular data field from the proposal via the application or web portal. Alternatively, if the member 110 is interested in reviewing additional detail with regard to each proposal option (e.g., additional reviews, additional business or product information, etc.), the member 110 may request this additional detail to be presented via the proposal.

As noted above, based on member interaction with a provided proposal, the proposal creation sub-system 502 may further train a machine learning algorithm or artificial intelligence used to determine or recommend what information should be presented to the member 110 and to similarly-situated members for similar experiences and/or tasks/task types. The proposal creation sub-system 502 may monitor or track member interaction with the proposal to determine the member's preferences regarding the information presented in the proposal for the particular experience. Further, the proposal creation sub-system 502 may monitor or track any messages exchanged between the member 110 and the representative 104 related to the proposal to further identify the member's preferences. In some instances, the proposal creation sub-system 502 may solicit feedback from the member 110 with regard to proposals provided by the representative 104 to identify the member's preferences. This feedback and information garnered through member interaction with the representative 104 regarding the proposal and with the proposal itself may be used to retrain the machine learning algorithm or artificial intelligence to provide more accurate or improved recommendations for information that should be presented to the member 110 and to similarly situated members in proposals for similar experiences and/or tasks/task types. The proposal creation sub-system 502 may further use the feedback and information garnered through member interaction with the representative 104 to update a member profile or model within the user datastore 108 for use in determining recommendations for information that should be presented to the member 110 in a proposal.

In some instances, each proposal presented to the member 110 may specify any costs associated with each proposal option. The presented costs may correspond to the estimated costs presented to the member 110 in the experience recommendation, such as in experience 400 described above in connection with FIG. 4. For instance, if the proposal corresponds to performance of the task by a third-party service or other service/entity associated with the task facilitation service for a particular experience, the proposal may include a quote submitted by the third-party service or other service/ entity in response to the job offer from the representative 104. The quote may indicate any costs associated with different aspects of the task associated with the experience, as well as any additional fees that may be required for performance of the task (e.g., taxes, material costs, etc.). These costs may be presented in different formats based on the requirements of the associated experience and corresponding tasks. If a member 110 accepts a particular proposal option for an experience, the representative 104 may communicate with the member 110 to ensure that the member is consenting to payment of the presented costs and any associated taxes and fees for the particular proposal option. In some instances, if a proposal option is selected with a static payment amount, the member 110 may be notified by the representative 104 if the actual payment amount required for fulfillment of the proposal option exceeds a threshold percentage or amount over the originally presented static payment amount.

In an embodiment, if a member 110 accepts a proposal option from the presented proposal, the task coordination system 108 moves the tasks associated with the presented proposal to an executing state and the representative 104 can proceed to execute on the proposal according to the selected proposal option. For instance, the representative 104 may contact one or more third-party services 114 and/or other services/entities associated with the task facilitation service to coordinate performance of one or more tasks according to the parameters defined in the proposal accepted by the member 110. Alternatively, if the representative 104 is to perform one or more tasks related to a selected experience for the benefit of the member 110, the representative 104 may begin performance of the task according to the parameters defined in the proposal accepted by the member 110.

In an embodiment, the representative 104 utilizes a task monitoring sub-system 504 of the task coordination system 108 to assist in the coordination of performance of tasks related to a selected experience according to the parameters defined in the proposal accepted by the member 110. The task monitoring sub-system 504 may be implemented using a computer system or as an application or other executable code implemented on a computer system of the task coordination system 108. If the coordination with a third-party service 114 may be performed automatically (e.g., third-party service 114 provides automated system for ordering, scheduling, payments, etc.), the task monitoring sub-system 504 may interact directly with the third-party service 114 and/or other service/entity affiliated with the task facilitation service to coordinate performance of tasks related to a selected experience according to the selected proposal option. The task monitoring sub-system 504 may provide any information from a third-party service 114 and/or other service/entity affiliated with the task facilitation service to the representative 104. The representative 104, in turn, may provide this information to the member 110 via the application or web portal utilized by the member to access the task facilitation service. Alternatively, the representative 104 may transmit the information to the member 110 via other communication methods (e.g., e-mail message, text message, etc.) to indicate that the third-party service 114 and/or other service/entity affiliated with the task facilitation service has initiated performance of one or more tasks according to the selected proposal option. If one or more tasks are to be performed by the representative 104 for the benefit of the member 110, the task monitoring sub-system 504 may monitor and interact with the representative 104 to coordinate performance of the one or more tasks according to the parameters defined in the proposal accepted by the member 110. For instance, the task monitoring sub-system 504 may provide the representative 104 with any resources (e.g., payment information, task information, preferred sources for purchases, etc.) that may be required for performance of the one or more tasks related to the selected experience.

In an embodiment, the task monitoring sub-system 504 can monitor performance of tasks by the representative 104 and/or third-party services 114 or other services/entities associated with the task facilitation service for a selected experience. For instance, the task monitoring sub-system 504 may record any information provided by the third-party services 114 or other services/entities associated with the task facilitation service with regard to the timeframe for performance of a task (e.g., estimated time for food to be ready for pickup, an estimated delivery time, etc.), the cost associated with performance of a task, any status updates with regard to performance of a task, and the like. The task monitoring sub-system 504 may associate this information with a data record corresponding to the task being performed within the task datastore 110. Status updates provided by third-party services 114 or other services/entities associated with the task facilitation service may be provided automatically to the member 110 via the application or web portal provided by the task facilitation service and to the representative 104. Alternatively, the status updates may be provided to the representative 104, which may provide these status updates to the member over the experience-specific chat session established between the member and the representative 104 or through other communication methods. If the representative 104 is performing a task related to the selected experience, the representative 104 may provide status updates with regard to its performance of the task to the member 110 via the application or web portal provided by the task facilitation service. The task monitoring sub-system 504 may associate these status updates with a data record corresponding to the task being performed within the task datastore 220.

In some instances, the task monitoring sub-system 504 may allow the third-party service or other service/entity engaged in performing the task associated with the experience to communicate with the member 110 directly to provide status updates related to the task. For instance, the task monitoring sub-system 504 may facilitate a communications channel between the member 110 and the third-party service or other service/entity through which the member 110 and the third-party service or other service/entity may exchange messages related to the task being performed. This communications channel may be provided through the interface specific to the task such that the communications channel is distinct from the general communications channel between the member 110 and the representative 104 and from any other task-related communications channels between the member 110 and the representative 104. In some instances, the third-party service or other service/entity may be added to the existing experience-specific communications channel between the member 110 and the representative 104. This may allow the member 110 and the representative 104 to actively engage the third-party service or other service/entity as the third-party service or other service/entity performs the assigned task.

As noted above, once an experience has been completed, the member 110 may provide feedback with regard to the performance of the representative 104 and/or third-party services 114 or other services/entities associated with the task facilitation service that performed the tasks related to the experience and according to the proposal option selected by the member 110. For instance, the member 110 may exchange one or more messages with the representative 104 over the experience-specific chat session or other communications channel to indicate its feedback with regard to the experience. In an embodiment, the task monitoring sub-system 504 provides the feedback to the proposal creation sub-system 502, which may use a machine learning algorithm or artificial intelligence to process feedback provided by the member 110 to improve the recommendations provided by the proposal creation sub-system 502 for proposal options, third-party services 114 or other services/entities associated with the task facilitation service that may perform tasks for selected experiences, and/or processes that may be performed by a representative 104 and/or third-party services 114 or other services/entities associated with the task facilitation service for completion of similar tasks for similar experiences. For instance, if the proposal creation sub-system 502 detects that the member is unsatisfied with the result provided by a third-party service 114 or other service/entity associated with the task facilitation service for a particular experience, the proposal creation sub-system 502 may utilize this feedback to further train the machine learning algorithm or artificial intelligence to reduce the likelihood of the third-party service 114 or other service/entity associated with the task facilitation service being recommended for similar experiences and to similarly-situated members. As another example, if the proposal creation sub-system 502 detects that the member is pleased with the result provided by a representative 104 for a particular experience, the proposal creation sub-system 502 may utilize this feedback to further train the machine learning algorithm or artificial intelligence to reinforce the operations performed by representatives for similar experiences and/or for similarly-situated members.

Figure 6:
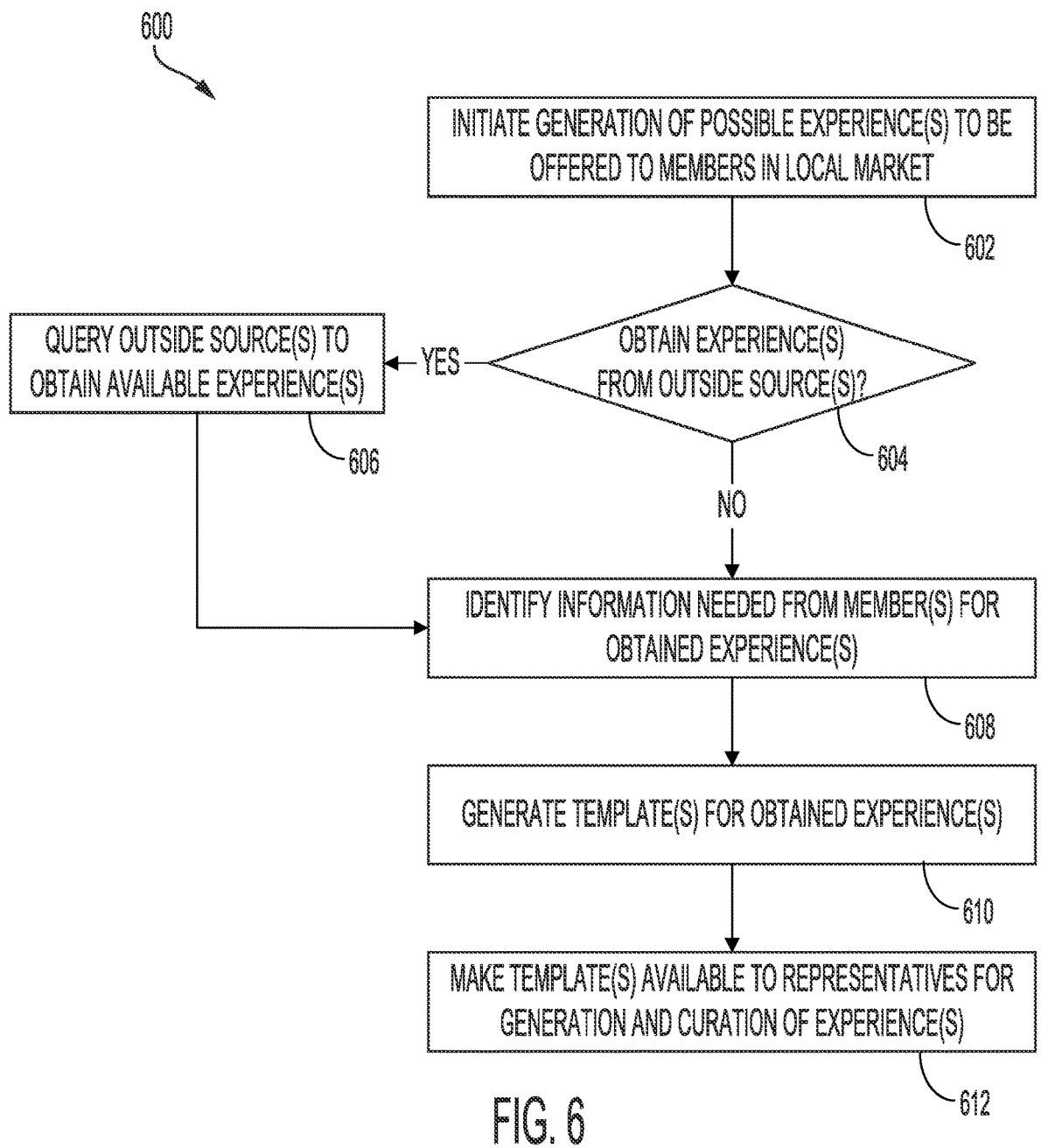
FIG. 6 shows an illustrative example of a process for generating a set of experiences that can be presented to members within a geographical region in accordance with at least one embodiment.

FIG. 6 shows an illustrative example of a process 600 for generating a set of experiences that can be presented to members within a geographical region in accordance with at least one embodiment. The process 600 may be performed by a task recommendation system of the task facilitation service. In some instances, certain operations related to the process 600 may be performed in conjunction with one or more representatives of the task facilitation service, as described herein. At step 602, the task recommendation system may initiate generation of one or more possible experiences that can be offered to members in each local market (e.g., geographic market in which the task facilitation service operates, etc.). The task recommendation system may initiate generation of these one or more possible experiences at regular time intervals (e.g., weekly, bi-weekly, monthly, etc.) or in response to a triggering event (e.g., average cognitive load score for members exceeds a maximum cognitive load threshold value for the geographic market, etc.), as described above.

At step 604, the task recommendation system may determine whether to obtain available experiences from one or more outside sources, such as third-party and other experience recommendation sources. For instance, the task facilitation service may partner with various organizations within each geographic market that provide or otherwise aggregate different experiences within each geographic market. As an illustrative example, the task facilitation service may partner with a publisher of a luxury and lifestyle travel magazine to obtain any recent news or information related to upcoming experiences that may be available within each geographic market in which the task facilitation service operates. As another illustrative example, the task facilitation service may partner with different online marketplaces for events, lodging, and the like to identify any unique experiences that may be available within each geographic market in which the task facilitation service operates. If such relationships are maintained between the task facilitation service and these third-party recommendation sources, the task facilitation service, at step 606, may automatically query various third-party recommendation sources within each geographic market to obtain any unique and/or time-limited experience opportunities that may be of interest to members of the task facilitation service. In addition to querying various third-party recommendation sources to identify any unique and/or time-limited experience opportunities for members of the task facilitation service, the task recommendation service may obtain possible experience recommendations from representatives within each geographic market. For instance, representatives within each geographic market may be aware of possible experiences that may be of interest to members of the task facilitation service based on their knowledge of the geographic market.

As noted above, the task recommendation system may store any identified experiences from third-party recommendation sources within a resource library maintained by the task facilitation service. For instance, the resource library may store information related to one or more third-party services and/or resources that may be used to define possible projects and/or tasks. Additionally, the resource library may store information corresponding to different experiences that may be available within certain geographic markets, such as in the geographic markets in which the task facilitation service operates and/or in which a concentration of members may be located. The resource library may store information corresponding to different experiences that may be available within any geographic market, as this may allow for the curation of experiences in different locations that may be of interest to members of the task facilitation service. Additionally, representatives and third-party entities may also update the resource library based on their knowledge of upcoming or otherwise available experiences, as described above. Thus, in some embodiments, the task recommendation system can query the resource library to identify any available experience opportunities for members of the task facilitation service. This query may be performed in addition to determining whether to obtain available experiences from one or more outside sources.

At step 608, the task recommendation system may identify what additional information may be needed from members of the task facilitation system for the available experiences obtained from the representatives associated with the task facilitation and from the third-party recommendation sources. For instance, if the task recommendation system identifies an available experience corresponding to a picnic that may be partaken by members of the task facilitation service, the task facilitation system may determine that additional information regarding the number of attendees for the picnic is required (e.g., to determine quantity of food, to determine a number of passes required, etc.). As another example, if the task recommendation system identifies an available experience corresponding to a sporting event, for which a range of ticket prices is known, the task facilitation system may determine that additional information regarding the number of tickets that are to be purchased and at which price point is required.

At step 610, the task facilitation system may generate a template for each available experience obtained from representatives and/or from third-party recommendation sources. Each template may indicate what information may be required from a member for planning an experience recommendation and what a proposal for the experience recommendation would look like in order to allow for representatives to easily generate and present the proposal to the member. For instance, the template may incorporate data from the resource library, as well as from various third-party recommendation sources that provide high-quality recommendations, such as travel guides, food and restaurant guides, reputable publications, and the like. A template corresponding to a particular experience recommendation may make it easier for a representative to complete definition of task(s) associated with the experience recommendation.

At step 612, the task recommendation system may make the set of templates corresponding to the available experiences obtained from representatives and/or from third-party recommendation sources available to representatives for generation and curation of experiences. As noted above, when a member indicates that it wishes to learn about a recommended experience or to partake in a recommended experience, a representative assigned to the member may receive a notification indicating that the member has opted to learn more about the recommended experience. In response to the notification, the representative, via a chat session established between the member and the representative for the recommended experience, may provide additional details related to the recommended experience. The representative may refer to the template corresponding to the particular experience recommendation to obtain any additional information that is available for the experience. Based on its review of the template, the representative may determine whether any additional information is required from the member regarding tasks associated with the experience recommendation that may be used by the representative to determine how best to perform the tasks. For example, if the template indicates that additional information regarding the number of attendees for a picnic is required (e.g., to determine quantity of food, to determine a number of passes required, etc.), the representative may ask the member, over the chat session, for this information.

In an embodiment, the task recommendation system can provide, to the representative, any relevant information from the member profile corresponding to the member that may be used to generate the tasks that are to be performed for curation of a recommended experience. For example, if the recommended experience is associated with a new task entitled "Lunch from Chez Panisse," the task recommendation system may determine that the new task is food related. Accordingly, the task recommendation system may process the member profile to identify portions of the member profile that may be relevant to the task (e.g., any dietary restrictions associated with the member and any other guests, any favorite foods, budgetary constraints for food-related tasks, etc.). The task recommendation system may automatically surface these portions of the member profile to the representative in order to allow the representative to use this information to generate new tasks for the recommended experience. Alternatively, the task recommendation system may automatically use this information to populate one or more fields within the template for creation of the new task.

Figure 7:
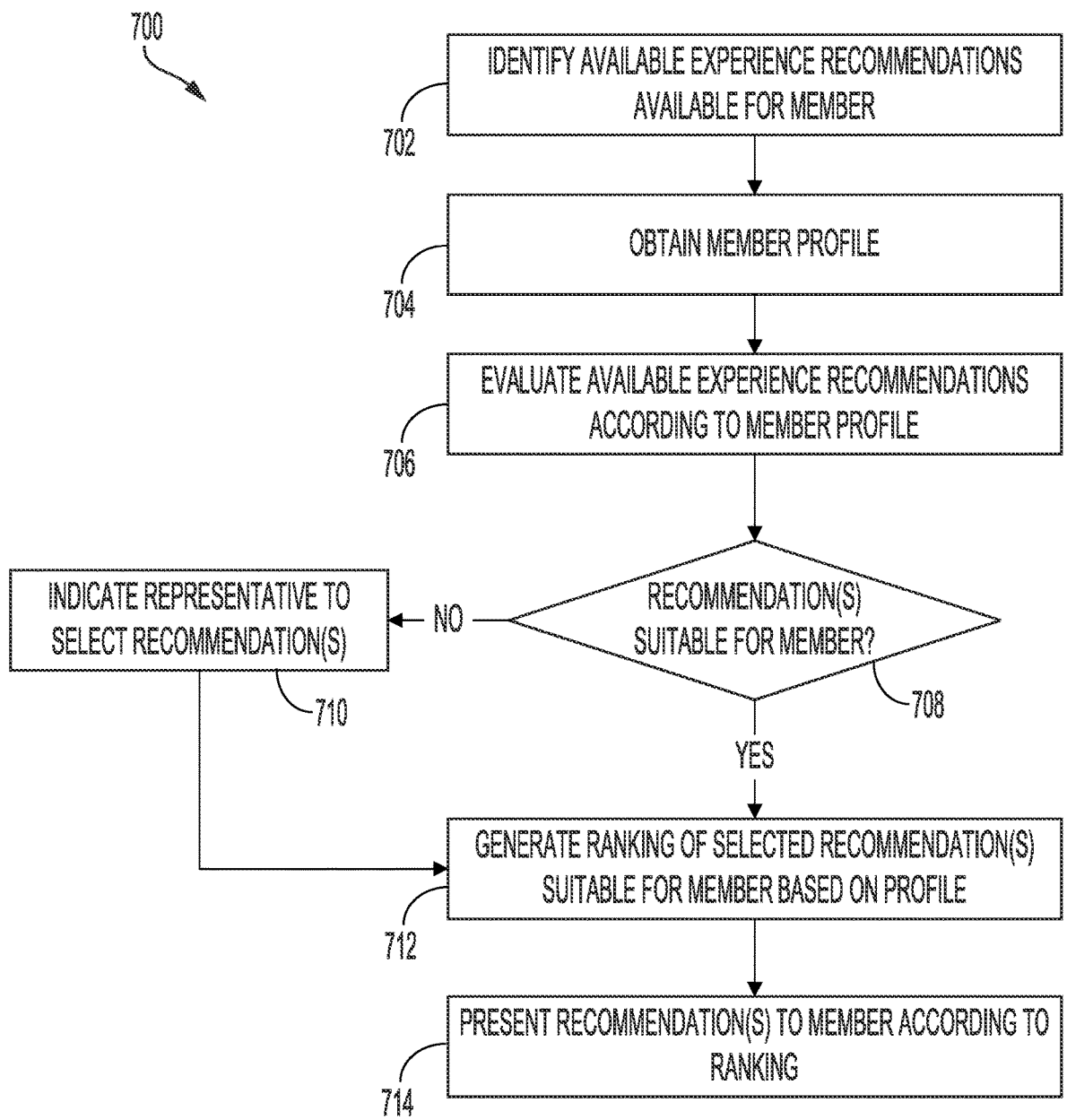
FIG. 7 shows an illustrative example of a process for ranking and presenting a set of available experience recommendations based on a profile for a member in accordance with at least one embodiment.

FIG. 7 shows an illustrative example of a process 700 for ranking and presenting a set of available experience recommendations based on a member profile associated with a member in accordance with at least one embodiment. The process 700 may be performed by a task recommendation system of the task facilitation service. In some instances, certain operations related to the process 700 may be performed in conjunction with one or more representatives of the task facilitation service, as described herein. At step 702, the task recommendation system may identify any available experience recommendations that are available for a particular member. For instance, as noted above, the task recommendation system may generate, in each geographic market in which the task facilitation service operates, a set of experiences that may be available to members of the task facilitation service. Available experiences may be organized according to the geographic market in which these experiences are made available. For instance, experiences available within a particular metropolitan area and its immediate environs may be associated, by the task recommendation system, with the particular metropolitan area. In an embodiment, to identify the available experience recommendations that may be available to the member, the task recommendation system can determine the location of the member (e.g., home address, Global Positioning System (GPS) coordinates of the member, etc.) via evaluation of the member profile associated with the member and/or other data obtained automatically from a member's computing device. Based on the given location of the member, the task recommendation system may select, from the set of available experiences, the available experiences that correspond to the given location of the member.

It should be noted that the experiences that may be available to a member may be identified based on factors other than geographical location of the member. As noted above, the task facilitation service may store, within a resource library, information corresponding to different experiences that may be available within any geographic market, as this may allow for the curation of experiences in different locations that may be of interest to members of the task facilitation service. In an embodiment, the task recommendation system may utilize a member profile associated with the member to identify the member's interests, any previously completed experiences, and the like to identify, from the resource library, possible experiences that may be appealing to the member without repeating any previously provided experience recommendations and completed experiences.

At step 704, the task recommendation system may obtain the member profile associated with the member from a user datastore. The member profile associated with the member may specify the member's physical address, age, information regarding other members of the household (e.g., spouse, children, other dependents, etc.), information regarding any interests or hobbies, languages spoken, and the like. Further, a member profile associated with the member may include historical data corresponding to conversations between the member and their assigned representative over time. This historical data may specify each message exchanged between the member and the representative and may provide additional contextual information related to the member (e.g., member sentiments at particular times or in response to certain situations, member requests submitted over time, etc.). The member profile may further define a set of attributes of the member that may be used by a representative to determine how best to approach the member in conversation, in recommending experiences, tasks, and proposals to the member, and in performance of the tasks for the benefit of the member. These attributes may include a measure of member behavior or preference in delegating certain categories of tasks to others or in performing certain categories of tasks themselves. For instance, a member attribute may provide a score or other metric corresponding to the probability of the member delegating different categories of tasks to others to perform. As another example, a member attribute may provide an indication of a member's preference to be presented with various proposals for completion of a task (if being delegated) or to present a single proposal for completion of the task that has been selected by the representative on behalf of the member. Other member attributes may indicate whether the member is concerned with budgets, with brand recognition, with reviews (e.g., restaurant reviews, product reviews, etc.), with punctuality, with speed of response, and the like. Member attributes may further include basic information about the member as described above.

At step 706, the task recommendation system may evaluate the available experience recommendations according to the member profile associated with the member. For instance, the task recommendation system may use the set of available experience recommendations and the member profile and/or other member attributes as input to a machine learning algorithm or artificial intelligence to generate an experience recommendation score for each available experience recommendation. The machine learning algorithm or artificial intelligence may be trained using supervised training techniques. For instance, a dataset of sample experience recommendations, member profiles, and resulting experience recommendation scores can be selected for training of the machine learning model.

The machine learning model may further be dynamically trained by soliciting feedback from members with regard to the experience recommendations provided to the members based on corresponding experience recommendation scores. For instance, the task recommendation system may obtain feedback from a member corresponding to the experience recommendations provided to the member. The member may specify, in its feedback, which experience recommendations were received positively and which experience recommendations were received negatively or with indifference. The machine learning algorithm or artificial intelligence may use this feedback to determine a new experience recommendation score for each of the experience recommendations provided to the member. This feedback and the new experience recommendation scores may be used to further train the machine learning algorithm or artificial intelligence to provide more accurate experience recommendation scores that may be used to select which experience recommendations are to be provided to a member.

At step 708, the task recommendation system may determine whether it has identified any experience recommendations that are suitable for the member. For instance, the task recommendation system may evaluate the experience recommendation score for each identified experience recommendation that may be available to the member to identify any available experiences having an experience recommendation score greater than a threshold value for the member. In an embodiment, if the task recommendation system does not automatically identify any experience recommendations suitable for the member based on their corresponding experience recommendation scores, the task recommendation system may, at step 710, indicate that the representative assigned to the member is to select one or more experience recommendations for the member. For instance, the task recommendation system may transmit a notification to the representative to identify possible experience recommendations that may be offered to the member. In the notification, the task recommendation system may provide one or more experience recommendations evaluated by the task recommendation system and the corresponding experience recommendation scores for these one or more experience recommendations. The representative may evaluate the provided one or more experience recommendations and determine whether any of the provided one or more experience recommendations may be presented to the member. For instance, the representative may review each experience recommendation provided by the task recommendation system and determine its own score for each experience recommendation based on its knowledge and experience with the member. Additionally, or alternatively, the representative may select one or more experience recommendations based on its own knowledge of the member and of the geographic market. For instance, the representative may review conversations with the member, as well as the member's profile and any known third-party experience recommendation sources, to determine whether to create new experience recommendations for the member. Once the representative has identified one or more experience recommendations that may be provided to the member or that otherwise may likely be appealing to the member, the representative may provide these experience recommendations to the task recommendation system.

At step 712, the task recommendation system may generate a ranking of the selected experience recommendations (e.g., experience recommendations having scores that satisfy a threshold requirement, experience recommendations provided by the representative, etc.) that are suitable for the member based on the member profile associated with the member. For instance, the task recommendation system may utilize the experience recommendation scores for the selected experience recommendations to generate the ranking. As noted above, the experience recommendation score for a particular experience recommendation may correspond to the probability of the experience recommendation being received positively by the member. For instance, a high experience recommendation score may correspond to a high probability that the member may select the experience recommendation or otherwise receive the experience recommendation positively. Alternatively, a low experience recommendation score may correspond to a low probability that the member may select the experience recommendation or otherwise show indifference or negative sentiment towards the experience recommendation. Based on experience recommendation scores for the set of available experience recommendations, the task recommendation system may rank the set of available experience recommendations.

At step 714, the task recommendation system or representative may present one or more experience recommendations to the member according to the ranking generated by the task recommendation system based on the scores generated by the aforementioned machine learning algorithm or artificial intelligence and/or input provided by the representative. For instance, the task recommendation system may select, from the ranked listing of available experience recommendations, a number of the highest ranked experience recommendations. The number of selected experience recommendations may be determined based on member preferences specified in the member profile. For instance, if a member has indicated that it prefers to be presented with a set number of task and experience recommendations at a given time, the task recommendation system may determine how many experience recommendations may be presented to the member. In some embodiments, the task recommendation system can control how many experience recommendations may be presented at any given time, as well as to when these experience recommendations may be presented. For instance, the task recommendation system may present one or more of the selected experience recommendations upon detection of the member's cognitive load score exceeding a threshold value. As another example, the task recommendation system may present one or more of the selected experience recommendations automatically in response to a member request.

It should be noted that the process 700 may include additional and/or alternative steps for presentation of one or more experience recommendations to a member. For instance, in an embodiment, the task recommendation system can use NLP or other artificial intelligence to evaluate exchanged messages or other communications from the member to determine whether to present one or more experience recommendations to the member. For instance, the task recommendation system may process any incoming messages from the member using NLP or other artificial intelligence to detect a request from the member to receive one or more experience recommendations. For instance, if the member expresses in a communication with the representative that it is interested in engaging in an experience (e.g., wishes to escape for the weekend, etc.), the task recommendation system may evaluate the ranked listing of available experience recommendations for the member and identify one or more experience recommendations that satisfy the member's criteria.

As noted above, the task recommendation system can provide the ranked listing of available experience recommendations to the representative to allow the representative to select which experience recommendations may be presented to the member. The representative may evaluate the ranked listing of available experience recommendations and, based on its knowledge of the member, select one or more available experience recommendations that may be presented to the member. The representative's manual selection of one or more experience recommendations, as well as member feedback related to the presentation of these one or more experience recommendations may be recorded and used by the task recommendation system to further train the machine learning algorithm or artificial intelligence used to rank available experience recommendations for the member.

In an embodiment, rather than using a machine learning algorithm or artificial intelligence to generate a ranked listing of available experience recommendations, the task recommendation system can automatically, and in real-time, process the member profile associated with the member and historical information corresponding to the member's previously curated experiences. For example, the task recommendation system may automatically process the member profile associated with the member to identify any previously recommended experiences, as well as any corresponding feedback with regard to these previously recommended experiences. For instance, if the representative assigned to the member previously recommended an experience related to a baseball game, but the member rejected the recommendation because the member is not interested in baseball, the task recommendation system may automatically determine that experiences related to baseball should not be recommended to the member. As another illustrative example, if the representative assigned to the member previously recommended an experience related to kayaking, and the member proceeded with the kayaking experience, for which the member provided positive feedback, the task recommendation system may determine that the member may be more heavily interested in outdoor activities. Accordingly, the task recommendation system may automatically update the member profile to indicate that the member has a preference for outdoor activities and may automatically recommend experiences that involve outdoor activities.

In addition to processing the member profile to identify any previously recommended experiences, the task recommendation system may automatically, and in real-time, query the resource library to identify any available experiences. Additionally, the task recommendation system may automatically, and in real-time, query other member profiles corresponding to similarly-situated members (e.g., members within the same geographic region as the member, members that share at least a minimum number of interests/hobbies, members that are within the same demographic as the member, etc.) to identify any previously recommended experiences and corresponding feedback provided for these previously recommended experiences. As the amount of previously recommended experiences and corresponding feedback may be voluminous in nature and impractical to be performed through the human mind in real-time, the task recommendation system may utilize one or more executable processes (e.g., application programming interfaces (APIs), classical algorithms, etc.) to simultaneously process any identified experiences, corresponding feedback, the member profile associated with the member, and the available experiences within the resource library to generate a listing of available experiences that may be recommended to the member. From this listing, the task recommendation system may automatically, and in real-time, generate a ranking of the experience recommendations included in this listing.

It should be noted that as member profiles and the resource library are continuously being updated in real-time as experiences are recommended and curated for the members of the task facilitation service and as new experiences are added, respectively, the task recommendation system may provide up-to-date experience rankings to representatives of the task facilitation service. This may increase the likelihood of representatives providing experience recommendations that are to be positively received by members of the task facilitation service, while ensuring that the experiences recommended are presently available to these members.

Figure 8:
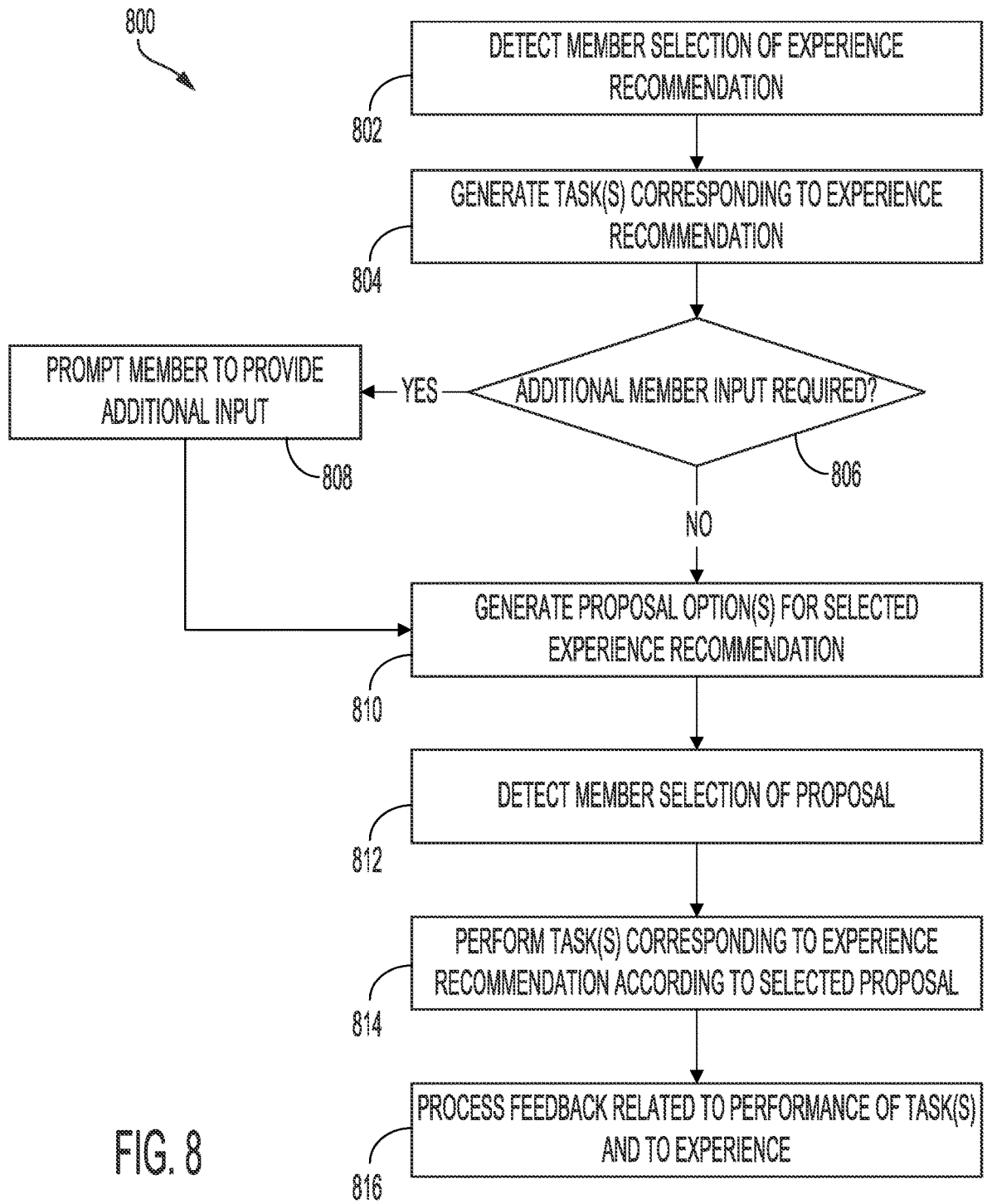
FIG. 8 shows an illustrative example of a process for generating and executing tasks associated with a selected experience recommendation in accordance with at least one embodiment.

FIG. 8 shows an illustrative example of a process 800 for generating and executing tasks associated with a selected experience recommendation in accordance with at least one embodiment. The process 800 may be performed by a representative in conjunction with a task recommendation system and task coordination system of the task facilitation service. At step 802, the representative and/or task recommendation system may detect member selection of a particular experience recommendation presented to the member. For instance, if the member indicates (such as through selection of the "Yes please!" GUI element illustrated in FIGS. 1 and 4) that it wishes to learn more about the recommended experience or to partake in the recommended experience, the representative may receive a notification indicating that the member has opted to learn more about the recommended experience. In response to the notification, the representative, via a chat session or other communications channel established between the member and the representative specifically for the recommended experience, may provide additional details related to the recommended experience. For instance, the representative may refer to the template corresponding to the particular experience recommendation to obtain any additional information that is available for the experience. In some instances, if the member indicates that it wishes to learn more about the recommended experience, the task recommendation system can evaluate the member profile associated with the member to determine how much information is to be provided to the member without increasing the likelihood of cognitive overload for the member.

At step 804, the representative or task recommendation system may generate one or more tasks corresponding to the selected experience recommendation. For instance, if the member determines that the representative is to proceed with the experience recommendation, the task recommendation system may add tasks associated with the experience recommendation to an active queue that may be used by the task recommendation system to determine which tasks a representative may work on for the benefit of the member. For instance, a representative may be presented with a limited set of tasks that the representative based on the prioritization or ranking of tasks performed by the task recommendation system. The selection of a limited set of tasks may limit the number of tasks that may be worked on by the representative at any given time, which may reduce the risk to the representative of being overburdened with working on a member's task list.

At step 806, the task recommendation system may determine whether additional member input is required for any of the generated tasks associated with the selected experience recommendation. For instance, if the member has opted to proceed with a particular experience recommendation, the task recommendation system may evaluate the template associated with the experience recommendation to determine what additional information is required from the member. If the additional member input is required, the representative or the task recommendation system, at step 808, may prompt the member to provide this additional input. As an illustrative example, if the template corresponding to the selected experience recommendation indicates that additional information regarding the number of attendees for a picnic is required (e.g., to determine quantity of food, to determine a number of passes required, etc.), the task recommendation system may prompt the representative to ask the member, over the chat session, for this information. It should be noted that the representative can review the template and prompt the member for any additional information necessary for performance of the tasks associated with the experience recommendation without involvement of the task recommendation system. Alternatively, the task recommendation system can automatically prompt the member to provide this additional information without representative intervention.

In an embodiment, the task recommendation system can automatically, and in real-time, parse the member profile associated with the member to obtain any information that may be required for the tasks associated with the selected experience recommendation. For example, if the representative generates a new task entitled "Lunch from Chez Panisse," the task recommendation system may determine that the new task is food related. Accordingly, the task recommendation system may process the member profile to identify portions of the member profile that may be relevant to the task (e.g., any dietary restrictions associated with the member and any other guests, any favorite foods, budgetary constraints for food-related tasks, etc.). The task recommendation system may automatically surface these portions of the member profile to the representative in order to allow the representative to use this information to generate the new task. Alternatively, the task recommendation system may automatically use this information to populate one or more fields within a task template for creation of the new task.

At step 810, the representative and/or task coordination system may generate one or more proposal options for the selected experience recommendation. For instance, once the member has provided any requisite information for the tasks related to the selected experience recommendation, the representative can generate one or more proposals for curation of the selected experience recommendation. For example, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member over the chat session and via the application provided by the task facilitation service.

In an embodiment, to generate a proposal, the representative may utilize the task coordination system. For instance, the representative may utilize a resource library maintained by the task coordination system to identify one or more third-party services and/or resources that may be used for performance of tasks associated with the selected experience for the benefit of the member according to the one or more task parameters identified by the representative and the task recommendation system, as described above. A proposal may specify a timeframe for completion of a task, identification of third-party services and/or other services/entities associated with the task facilitation service (if any) that are to be engaged for completion of a task, a budget estimate for completion of a task, resources or types of resources to be used for completion of a task, and the like. The representative may present the proposal to the member via the chat session to solicit a response from the member to either proceed with the proposal or to provide an alternative proposal for completion of the tasks associated with the selected experience.

At step 812, the representative or task coordination system may detect member selection of a particular proposal related to an experience recommendation. For instance, the member may select a button or other GUI element associated with the selected experience to indicate that it would like for the representative to proceed with a particular proposal. Additionally, or alternatively, the member may transmit a message or other communication, over the experience-specific chat session or communications channel, to the representative to indicate that it would like for the representative to proceed with a particular proposal. In some instances, in addition to selecting a particular proposal, a member may indicate that it wishes to defer to the representative for performance of the tasks related to the selected experience, as noted above. This may allow the representative to coordinate with third-party services and other services/entities associated with the task facilitation service and/or utilize various resources to curate the selected experience according to the selected proposal.

At step 814, the representative and/or task coordination system may perform the one or more tasks corresponding to the selected experience according to the proposal selected by the member. For instance, the representative may coordinate with one or more third-party services and/or other services/entities associated with the task facilitation service for completion of any tasks associated with the selected experience. The representative may utilize the task coordination system to identify and contact one or more third-party services and/or other services/entities associated with the task facilitation service for performance of any tasks associated with the selected experience. In some instances, the task coordination system may be associated with a resource library that includes detailed information related to third-party services and/or other services/entities associated with the task facilitation service. For example, an entry for a third-party service or other service/entity in the resource library may include contact information for the third-party service or other service/entity, any available price sheets for services or goods offered by the third-party service or other service/entity, listings of goods and/or services offered by the third-party service or other service/entity, hours of operation, ratings or scores according to different categories of members, and the like. The representative may query the resource library to identify the one or more third-party services and/or other services/entities associated with the task facilitation service that are to perform any of the tasks associated with the selected experience and determine an estimated cost for performance of the task. Further, the representative may contact the one or more third-party services and/or other services/entities associated with the task facilitation service to coordinate performance of any of the tasks associated with the selected experience.

As noted above, the representative can query the resource library to identify one or more third-party services and other services/entities affiliated with the task facilitation service from which to solicit quotes for completion of any of the one or more tasks associated with the selected experience recommendation. For instance, for a particular task associated with the selected experience recommendation, the representative may transmit a job offer to these one or more third-party services and other services/entities. Through an application or web portal provided by the task facilitation service, a third-party service or other service/entity may review the job offer and determine whether to submit a quote for completion of the task or to decline the job offer. If a third-party service or other service/entity opts to reject the job offer, the representative may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative may use any provided quotes from the third-party services and/or other services/entities to generate different proposal options for completion of the task associated with the selected experience recommendation. These different proposal options may be presented as a proposal to the member through the task-specific interface corresponding to the particular task that is to be completed. If the member selects a particular proposal option from the set of proposal options presented through the task-specific interface, the representative may transmit a notification to the third-party service or other service/entity that submitted the quote associated with the selected proposal option to indicate that it has been selected for completion of the task. Thus, the process of identifying one or more third-party services and/or other services/entities for performance of tasks related to a selected experience may be performed as part of step 810 rather than as a part of step 814.

In some instances, if a task associated with the selected experience is to be completed by the representative, the representative may utilize the task coordination system to identify any resources that may be utilized by the representative for performance of the task. The resource library may include detailed information related to different resources available for performance of a task. Further, the representative may obtain, from the member's profile, available payment information of the member that may be used to provide payment for any resources required by the representative to complete the task.

If the representative is able to coordinate with one or more third-party services and/or other services/entities for performance of one or more tasks associated with the selected experience, the representative may provide an update to the member to indicate when the task is expected to be completed and the estimated cost for completion of the task. If any of the information provided in the update does not correspond to the estimates provided in the proposal, the member may be provided with an option to cancel the particular task or otherwise make changes to the task. Further, once the representative has contracted with one or more third-party services and/or other services/entities for performance of tasks associated with the selected experience, the task coordination system can monitor performance of these tasks by these third-party services and/or other services/entities. For instance, the task coordination system may record any information provided by the third-party services and/or other services/entities with regard to the timeframe for performance of a task, the cost associated with performance of a task, any status updates with regard to performance of a task, and the like. Status updates provided by third-party services and/or other services/entities may be provided automatically to the member via the application provided by the task facilitation service and to the representative.

As noted above, the task coordination system may allow the third-party service or other service/entity engaged in performing the task associated with the experience to communicate with the member directly to provide status updates related to the task. For instance, the task coordination system may facilitate a communications channel between the member and the third-party service or other service/entity through which the member and the third-party service or other service/entity may exchange messages related to the task being performed. This communications channel may be provided through the interface specific to the task such that the communications channel is distinct from the general communications channel between the member and the representative and from any other task-related communications channels between the member and the representative. In some instances, the third-party service or other service/entity may be added to the existing experience-specific communications channel between the member and the representative. This may allow the member and the representative to actively engage the third-party service or other service/entity as the third-party service or other service/entity performs the assigned task.

If a task associated with the selected experience is to be performed by the representative, the task coordination system can monitor performance of the task by the representative. For instance, the task coordination system may monitor, in real-time, any communications between the representative and the member regarding the representative's performance of a task associated with the selected experience. These communications may include messages from the representative indicating any status updates with regard to performance of the task, any purchases or expenses incurred by the representative in performing the task, the timeframe for completion of the task, and the like.

At step 816, the representative and/or task recommendation system can process any feedback related to performance of the tasks related to the experience and to the experience itself in order to update the machine learning algorithm or artificial intelligence that is used to select particular experience recommendations for members of the task facilitation service. For instance, once the member has completed the selected experience, the member may be prompted to provide feedback with regard to the completion of tasks associated with the selected experience and with regard to the selected experience itself. Further, the member may be prompted to provide feedback with regard to the quality of the proposal provided by the representative and as to whether the performance of the tasks associated with the experience resulted in a positive experience for the member. Using the responses provided by the member, the task recommendation system may train or otherwise update the machine learning algorithms or artificial intelligence utilized by the task recommendation system and the task coordination system to provide better identification of possible experience recommendations and corresponding tasks, creation of proposals, identification of third-party services for completion of tasks associated with selected experiences, identification of resources that may be provided to the representative for performance of a task associated with a selected experience, and the like.

Figure 9:
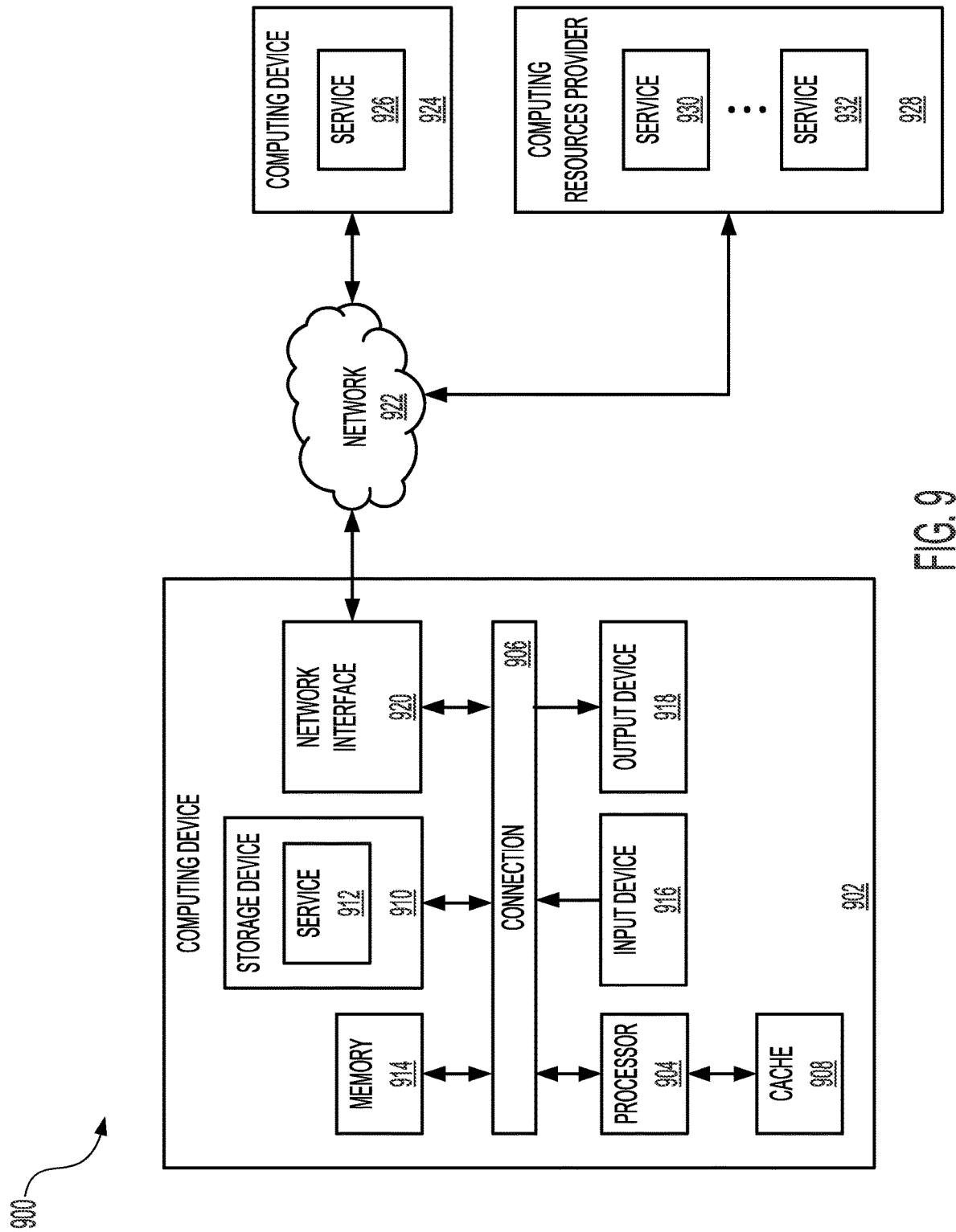
FIG. 9 shows a computing system architecture including various components in electrical communication with each other using a connection in accordance with various embodiments.

FIG. 9 illustrates a computing system architecture 900, including various components in electrical communication with each other, in accordance with some embodiments. The example computing system architecture 900 illustrated in FIG. 9 includes a computing device 902, which has various components in electrical communication with each other using a connection 906, such as a bus, in accordance with some implementations. The example computing system architecture 900 includes a processing unit 904 that is in electrical communication with various system components, using the connection 906, and including the system memory 914. In some embodiments, the system memory 914 includes read-only memory (ROM), random-access memory (RAM), and other such memory technologies including, but not limited to, those described herein. In some embodiments, the example computing system architecture 900 includes a cache 908 of high-speed memory connected directly with, in close proximity to, or integrated as part of the processor 904. The system architecture 900 can copy data from the memory 914 and/or the storage device 910 to the cache 908 for quick access by the processor 904. In this way, the cache 908 can provide a performance boost that decreases or eliminates processor delays in the processor 904 due to waiting for data. Using modules, methods and services such as those described herein, the processor 904 can be configured to perform various actions. In some embodiments, the cache 908 may include multiple types of cache including, for example, level one (L1) and level two (L2) cache. The memory 914 may be referred to herein as system memory or computer system memory. The memory 914 may include, at various times, elements of an operating system, one or more applications, data associated with the operating system or the one or more applications, or other such data associated with the computing device 902.

Other system memory 914 can be available for use as well. The memory 914 can include multiple different types of memory with different performance characteristics. The processor 904 can include any general purpose processor and one or more hardware or software services, such as service 912 stored in storage device 910, configured to control the processor 904 as well as a special-purpose processor where software instructions are incorporated into the actual processor design. The processor 904 can be a completely self-contained computing system, containing multiple cores or processors, connectors (e.g., buses), memory, memory controllers, caches, etc. In some embodiments, such a self-contained computing system with multiple cores is symmetric. In some embodiments, a self-contained computing system with multiple cores is asymmetric. In some embodiments, the processor 904 can be a microprocessor, a microcontroller, a digital signal processor ("DSP"), or a combination of these and/or other types of processors. In some embodiments, the processor 904 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 900, an input device 916 can represent any number of input mechanisms, such as a microphone for speech, a touch-sensitive screen for gesture or graphical input, keyboard, mouse, motion input, pen, and other such input devices. An output device 918 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 900. In some embodiments, the input device 916 and/or the output device 918 can be coupled to the computing device 902 using a remote connection device such as, for example, a communication interface such as the network interface 920 described herein. In such embodiments, the communication interface can govern and manage the input and output received from the attached input device 916 and/or output device 918. As may be contemplated, there is no restriction on operating on any particular hardware arrangement and accordingly the basic features here may easily be substituted for other hardware, software, or firmware arrangements as they are developed.

In some embodiments, the storage device 910 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 910 can include hardware and/or software services such as service 912 that can control or configure the processor 904 to perform one or more functions including, but not limited to, the methods, processes, functions, systems, and services described herein in various embodiments. In some embodiments, the hardware or software services can be implemented as modules. As illustrated in example computing system architecture 900, the storage device 910 can be connected to other parts of the computing device 902 using the system connection 906. In an embodiment, a hardware service or hardware module such as service 912, that performs a function can include a software component stored in a non-transitory computer-readable medium that, in connection with the necessary hardware components, such as the processor 904, connection 906, cache 908, storage device 910, memory 914, input device 916, output device 918, and so forth, can carry out the functions such as those described herein.

The disclosed processed for generating and executing experience recommendations can be performed using a computing system such as the example computing system illustrated in FIG. 9, using one or more components of the example computing system architecture 900. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for generating and executing experience recommendations described herein by, for example, executing code using a processor such as processor 904 wherein the code is stored in memory such as memory 914 as described herein. One or more of a user device, a provider server or system, a database system, or other such devices, services, or systems may include some or all of the components of the computing system such as the example computing system illustrated in FIG. 9, using one or more components of the example computing system architecture 900 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 928. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 904 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 914 can be coupled to the processor 904 by, for example, a connector such as connector 906, or a bus. As used herein, a connector or bus such as connector 906 is a communications system that transfers data between components within the computing device 902 and may, in some embodiments, be used to transfer data between computing devices. The connector 906 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 914 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 914 can also include magnetic or optical data storage media including read-only (e.g., CD ROM and DVD ROM) or otherwise (e.g., CD or DVD). The memory can be local, remote, or distributed.

As described above, the connector 906 (or bus) can also couple the processor 904 to the storage device 910, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 910. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 906 can also couple the processor 904 to a network interface device such as the network interface 920. The interface can include one or more of a modem or other such network interfaces including, but not limited to those described herein. It will be appreciated that the network interface 920 may be considered to be part of the computing device 902 or may be separate from the computing device 902. The network interface 920 can include one or more of an analog modem, Integrated Services Digital Network (ISDN) modem, cable modem, token ring interface, satellite transmission interface, or other interfaces for coupling a computer system to other computer systems. In some embodiments, the network interface 920 can include one or more input and/or output (I/O) devices. The I/O devices can include, by way of example but not limitation, input devices such as input device 916 and/or output devices such as output device 918. For example, the network interface 920 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and decendents, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 902 can be connected to one or more additional computing devices such as computing device 924 via a network 922 using a connection such as the network interface 920. In such embodiments, the computing device 924 may execute one or more services 926 to perform one or more functions under the control of, or on behalf of, programs and/or services operating on computing device 902. In some embodiments, a computing device such as computing device 924 may include one or more of the types of components as described in connection with computing device 902 including, but not limited to, a processor such as processor 904, a connection such as connection 906, a cache such as cache 908, a storage device such as storage device 910, memory such as memory 914, an input device such as input device 916, and an output device such as output device 918. In such embodiments, the computing device 924 can carry out the functions such as those described herein in connection with computing device 902. In some embodiments, the computing device 902 can be connected to a plurality of computing devices such as computing device 924, each of which may also be connected to a plurality of computing devices such as computing device 924. Such an embodiment may be referred to herein as a distributed computing environment.

The network 922 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 922 can be wired connections, wireless connections, or combinations thereof. Communications via the network 922 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 922, within the computing device 902, within the computing device 924, or within the computing resources provider 928 can include information, which also may be referred to herein as content. The information may include text, graphics, audio, video, haptics, and/or any other information that can be provided to a user of the computing device such as the computing device 902. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 902 and presented to a user of the computing device 902 using forms that are perceptible via sight, sound, smell, taste, touch, or other such mechanisms. In some embodiments, communications over the network 922 can be received and/or processed by a computing device configured as a server. Such communications can be sent and received using PUP: Hypertext Preprocessor ("PUP"), Python™, Ruby, Perl® and variants, Java®, HTML, XML, or another such server-side processing language.

In some embodiments, the computing device 902 and/or the computing device 924 can be connected to a computing resources provider 928 via the network 922 using a network interface such as those described herein (e.g. network interface 920). In such embodiments, one or more systems (e.g., service 930 and service 932) hosted within the computing resources provider 928 (also referred to herein as within "a computing resources provider environment") may execute one or more services to perform one or more functions under the control of, or on behalf of, programs and/or services operating on computing device 902 and/or computing device 924. Systems such as service 930 and service 932 may include one or more computing devices such as those described herein to execute computer code to perform the one or more functions under the control of, or on behalf of, programs and/or services operating on computing device 902 and/or computing device 924.

For example, the computing resources provider 928 may provide a service, operating on service 930 to store data for the computing device 902 when, for example, the amount of data that the computing device 902 exceeds the capacity of storage device 910. In another example, the computing resources provider 928 may provide a service to first instantiate a virtual machine (VM) on service 932, use that VM to access the data stored on service 932, perform one or more operations on that data, and provide a result of those one or more operations to the computing device 902. Such operations (e.g., data storage and VM instantiation) may be referred to herein as operating "in the cloud," "within a cloud computing environment," or "within a hosted virtual machine environment," and the computing resources provider 928 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 928 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 930 and service 932 may implement versions of various services (e.g., the service 912 or the service 926) on behalf of, or under the control of, computing device 902 and/or computing device 924. Such implemented versions of various services may involve one or more virtualization techniques so that, for example, it may appear to a user of computing device 902 that the service 912 is executing on the computing device 902 when the service is executing on, for example, service 930. As may also be contemplated, the various services operating within the computing resources provider 928 environment may be distributed among various systems within the environment as well as partially distributed onto computing device 924 and/or computing device 902.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 902) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 6-8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 902.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
automatically detecting a request to identify one or more experience recommendations for a member, wherein the request is automatically detected by using natural language processing to evaluate different messages exchanged over an ongoing communications session between the member and a representative;
identifying a set of experience preferences associated with the member, wherein the set of experience preferences is identified based on a member profile;
identifying a set of available experiences implemented to generate different experience recommendations for reducing levels of stress associated with different members;
processing the set of available experiences and the set of experience preferences through a trained machine learning algorithm to generate a set of experience recommendations, wherein the trained machine learning algorithm is trained using a dataset of sample experience recommendations and sample member profiles, and wherein the set of experience recommendations corresponds to different available experiences selected according to the set of experience preferences;
providing the set of experience recommendations through the ongoing communications session;
evaluating new communications exchanged over the ongoing communications session to detect selection of an experience recommendation, wherein the selection is an indication of a request to curate a corresponding experience;
generating a project-specific interface associated with the corresponding experience, wherein the project-specific interface is generated to facilitate an experience-specific communications session, and wherein the experience-specific communications session and the ongoing communications session are distinct;
monitoring in real-time performance of one or more tasks corresponding to the experience recommendation;
obtaining, through the experience-specific communications session, feedback corresponding to the performance of the one or more tasks, wherein the feedback includes an indication of whether the one or more tasks resulted in a positive outcome and reduction in a level of stress associated with the member; and
updating the member profile and the trained machine learning algorithm according to the feedback, wherein the trained machine learning algorithm is updated to generate new experience recommendations that have a higher likelihood of being selected by different members.

2. The computer-implemented method of claim 1, wherein the set of experience recommendations is generated based on experience recommendation scores corresponding to the different available experiences, and wherein an experience recommendation score corresponds to a likelihood of a corresponding experience recommendation being selected by the member.

3. The computer-implemented method of claim 1, further comprising:
identifying a template corresponding to the experience recommendation selected by the member, wherein the template indicates additional information required from the member for the performance of the one or more tasks; and
automatically prompting the member through the experience-specific communications session to provide the additional information, wherein the member is automatically prompted without representative intervention.

4. The computer-implemented method of claim 1, further comprising:
detecting rejection of another experience recommendation from the one or more experience recommendations; and
automatically updating the member profile based on the rejection to reduce a likelihood of other experience recommendations similar to the other experience recommendation being selected for the member.

5. The computer-implemented method of claim 1, further comprising:
generating a set of task-specific interfaces corresponding to the one or more tasks, wherein the set of task-specific interfaces is accessible through the project-specific interface, and wherein a task-specific interface provides a task-specific communications session.

6. The computer-implemented method of claim 1, further comprising:
processing the updated member profile through the trained machine learning algorithm to generate a new set of experience recommendations, wherein the updated member profile is processed without representative interaction.

7. The computer-implemented method of claim 1, wherein obtaining the feedback further comprises:
automatically soliciting the member through the experience-specific communications session for the feedback.

8. A system, comprising:
one or more processors; and
memory storing thereon instructions that, as a result of being executed by the one or more processors, cause the system to:
automatically detect a request to identify one or more experience recommendations for a member, wherein the request is automatically detected by using natural language processing to evaluate different messages exchanged over an ongoing communications session between the member and a representative;
identify a set of experience preferences associated with the member, wherein the set of experience preferences is identified based on a member profile;
identify a set of available experiences implemented to generate different experience recommendations for reducing levels of stress associated with different members;
process the set of available experiences and the set of experience preferences through a trained machine learning algorithm to generate a set of experience recommendations, wherein the trained machine learning algorithm is trained using a dataset of sample experience recommendations and sample member profiles, and wherein the set of experience recommendations corresponds to different available experiences selected according to the set of experience preferences;
provide the set of experience recommendations through the ongoing communications session;
evaluate new communications exchanged over the ongoing communications session to detect selection of an experience recommendation, wherein the selection is an indication of a request to curate a corresponding experience;
generate a project-specific interface associated with the corresponding experience, wherein the project-specific interface is generated to facilitate an experience-specific communications session, and wherein the experience-specific communications session and the ongoing communications session are distinct;
monitor in real-time performance of one or more tasks corresponding to the experience recommendation;
obtain, through the experience-specific communications session, feedback corresponding to the performance of the one or more tasks, wherein the feedback includes an indication of whether the one or more tasks resulted in a positive outcome and reduction in a level of stress associated with the member; and
update the member profile and the trained machine learning algorithm according to the feedback, wherein the trained machine learning algorithm is updated to generate new experience recommendations that have a higher likelihood of being selected by different members.

9. The system of claim 8, wherein the set of experience recommendations is generated based on experience recommendation scores corresponding to the different available experiences, and wherein an experience recommendation score corresponds to a likelihood of a corresponding experience recommendation being selected by the member.

10. The system of claim 8, wherein the instructions further cause the system to:
identify a template corresponding to the experience recommendation selected by the member, wherein the template indicates additional information required from the member for the performance of the one or more tasks; and
automatically prompt the member through the experience-specific communications session to provide the additional information, wherein the member is automatically prompted without representative intervention.

11. The system of claim 8, wherein the instructions further cause the system to:
detect rejection of another experience recommendation from the one or more experience recommendations; and
automatically update the member profile based on the rejection to reduce a likelihood of other experience recommendations similar to the other experience recommendation being selected for the member.

12. The system of claim 8, wherein the instructions further cause the system to:
generate a set of task-specific interfaces corresponding to the one or more tasks, wherein the set of task-specific interfaces is accessible through the project-specific interface, and wherein a task-specific interface provides a task-specific communications session.

13. The system of claim 8, wherein the instructions further cause the system to:

process the updated member profile through the trained machine learning algorithm to generate a new set of experience recommendations, wherein the updated member profile is processed without representative interaction.

14. The system of claim 8, wherein the instructions that cause the system to obtain the feedback further cause the system to:
automatically solicit the member through the experience-specific communications session for the feedback.

15. A non-transitory, computer-readable storage medium storing thereon executable instructions that, as a result of being executed by a computer system, cause the computer system to:
automatically detect a request to identify one or more experience recommendations for a member, wherein the request is automatically detected by using natural language processing to evaluate different messages exchanged over an ongoing communications session between the member and a representative;
identify a set of experience preferences associated with the member, wherein the set of experience preferences is identified based on a member profile;
identify a set of available experiences implemented to generate different experience recommendations for reducing levels of stress associated with different members;
process the set of available experiences and the set of experience preferences through a trained machine learning algorithm to generate a set of experience recommendations, wherein the trained machine learning algorithm is trained using a dataset of sample experience recommendations and sample member profiles, and wherein the set of experience recommendations corresponds to one or more different available experiences selected according to the set of experience preferences;
provide the set of experience recommendations through the ongoing communications session;
evaluate new communications exchanged over the ongoing communications session to detect selection of an experience recommendation, wherein the selection is an indication of a request to curate a corresponding experience;
generate a project-specific interface associated with the corresponding experience, wherein the project-specific interface is generated to facilitate an experience-specific communications session, and wherein the experience-specific communications session and the ongoing communications session are distinct;
monitor in real-time performance of one or more tasks corresponding to the experience recommendation;
obtain, through the experience-specific communications session, feedback corresponding to the performance of the one or more tasks, wherein the feedback includes an indication of whether the one or more tasks resulted in a positive outcome and reduction in a level of stress associated with the member; and
update the member profile and the trained machine learning algorithm according to the feedback, wherein the trained machine learning algorithm is updated to generate new experience recommendations that have a higher likelihood of being selected by different members.

16. The non-transitory, computer-readable storage medium of claim 15, wherein the set of experience recommendations is generated based on experience recommendation scores corresponding to the different available experiences, and wherein an experience recommendation score corresponds to a likelihood of a corresponding experience recommendation being selected by the member.

17. The non-transitory, computer-readable storage medium of claim 15, wherein the executable instructions further cause the computer system to:
identify a template corresponding to the experience recommendation selected by the member, wherein the template indicates additional information required from the member for the performance of the one or more tasks; and
automatically prompt the member through the experience-specific communications session to provide the additional information, wherein the member is automatically prompted without representative intervention.

18. The non-transitory, computer-readable storage medium of claim 15, wherein the executable instructions further cause the computer system to:
detect rejection of another experience recommendation from the one or more experience recommendations; and
automatically update the member profile based on the rejection to reduce a likelihood of other experience recommendations similar to the other experience recommendation being selected for the member.

19. The non-transitory, computer-readable storage medium of claim 15, wherein the executable instructions further cause the computer system to:
generate a set of task-specific interfaces corresponding to the one or more tasks, wherein the set of task-specific interfaces is accessible through the project-specific interface, and wherein a task-specific interface provides a task-specific communications session.

20. The non-transitory, computer-readable storage medium of claim 15, wherein the executable instructions further cause the computer system to:
process the updated member profile through the trained machine learning algorithm to generate a new set of experience recommendations, wherein the updated member profile is processed without representative interaction.

21. The non-transitory, computer-readable storage medium of claim 15, wherein the executable instructions that cause the computer system to obtain the feedback further cause the computer system to:
automatically solicit the member through the experience-specific communications session for the feedback.

* * * * *